US008730876B2

(12) United States Patent
Nakao et al.

(10) Patent No.: US 8,730,876 B2
(45) Date of Patent: *May 20, 2014

(54) MIMO RECEPTION DEVICE AND MIMO RECEPTION METHOD

(71) Applicant: Panasonic Corporation, Osaka (JP)

(72) Inventors: Seigo Nakao, Kanagawa (JP); Masayuki Hoshino, Kanagawa (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/926,892

(22) Filed: Jun. 25, 2013

(65) Prior Publication Data

US 2013/0287149 A1 Oct. 31, 2013

Related U.S. Application Data

(63) Continuation of application No. 13/002,262, filed as application No. PCT/JP2009/003559 on Jul. 28, 2009, now Pat. No. 8,493,916.

(30) Foreign Application Priority Data

Jul. 29, 2008 (JP) ................................. 2008-195361
Jan. 15, 2009 (JP) ................................. 2009-006967

(51) Int. Cl.
H04W 4/00 (2009.01)
H04W 72/04 (2009.01)
H04L 1/16 (2006.01)
H04L 1/18 (2006.01)

(52) U.S. Cl.
CPC ......... H04W 72/0406 (2013.01); H04L 1/1628 (2013.01); H04L 1/18 (2013.01)
USPC .......................................... 370/328; 714/750

(58) Field of Classification Search
None
See application file for complete search history.

(56) References Cited

U.S. PATENT DOCUMENTS

| 7,298,805 | B2 | 11/2007 | Walton et al. |
| 2008/0227481 | A1 | 9/2008 | Naguib et al. |
| 2009/0052357 | A1 | 2/2009 | Suo et al. |
| 2010/0177741 | A1 | 7/2010 | Zhang et al. |

FOREIGN PATENT DOCUMENTS

CN 1906864 A 1/2007
(Continued)

OTHER PUBLICATIONS

Office Action, dated Jul. 17, 2013, for corresponding Russian Application No. 2011103196/07 (004379), 5 pages.

(Continued)

Primary Examiner — Bob Phunkulh
(74) Attorney, Agent, or Firm — Seed IP Law Group PLLC

(57) ABSTRACT

Provided are a MIMO transmission device and a MIMO transmission method which can improve reception quality of a response signal. A terminal (100) as the MIMO transmission device maps a first and a second element of the ACK/NACK signal vector formed from ACK/NACK signals onto a first and a second stream, respectively, and transmits the elements contained in a 2SC-FDMA symbol in a single slot. In the terminal (100), a response signal vector formation unit (140) forms [a·$S_{ack}$, 0] as the ACK/NACK signal vector in a first SC-FDMA symbol and [0, a·$S_{ack}$] as an ACK/NACK signal vector in a second SC-FDMA symbol. A precoding unit (165) uses a unitary matrix to precode the ACK/NACK signal vector formed in the response signal vector formation unit (140).

16 Claims, 17 Drawing Sheets

(56) References Cited

FOREIGN PATENT DOCUMENTS

| JP | 2009516438 A | 4/2009 |
|---|---|---|
| JP | 2010525721 A | 7/2010 |
| WO | 99/48227 A1 | 9/1999 |
| WO | 2008019600 A1 | 2/2008 |
| WO | 2008042904 A2 | 4/2008 |
| WO | 2008042904 A3 | 4/2008 |
| WO | 2008133440 A1 | 11/2008 |

OTHER PUBLICATIONS

Nokia Siemens Networks, Nokia, "ACK/NACK modulation with UL data," R1-073657, 3GPP TSG RAN WG1 Meeting #50, Agenda Item: 7.2.4, Athens, Greece, Aug. 20-24, 2007, 4 pages.

Samsung, "Selection of Orthogonal Cover Walsh Codes for High Speed UL ACK," R1-074091, 3GPP TSG RAN WG1 Meeting #50bis, Agenda Item: 6.2.4, Shanghai, China, Oct. 8-12, 2007, pp. 1-5.

NTT DoCoMo, "On Necessity of ACK/NAK Repetition," R1-081407, 3GPP TSG RAN WG1 Meeting #52bis, Agenda Item: 6.1.4, Shenzhen, China, Mar. 31-Apr. 4, 2008, pp. 1-7.

Taoka et al., "Investigation on Reference Signal Structure Suitable for MIMO Channel Transmission Using Precoding in Evolved UTRA Downlink," The Institute of Electronics, Information and Communication Engineers, IEICE Technical Report RCS2007-51 (Jul. 2007), pp. 131-136.

3GPP TS 36.211 V8.3.0, "3rd Generation Partnership Project; Technical Specification Group Radio Access Network; Evolved Universal Terrestrial Radio Access (E-UTRA); Physical Channels and Modulation (Release 8)," May 2008, 77 pages.

3GPP TS 36.212 V8.3.0, "3rd Generation Partnership Project; Technical Specification Group Radio Access Network; Evolved Universal Terrestrial Radio Access (E-UTRA); Multiplexing and channel coding (Release 8)," May 2008, 48 pages.

International Search Report dated Aug. 25, 2009, for corresponding International Application No. PCT/JP2009/003559, 4 pages.

Notice of the Reasons for Rejection, dated May 28, 2013, for corresponding JP Application No. 2010-522618, 4 pages.

MIMO RECEPTION DEVICE AND MIMO RECEPTION METHOD

BACKGROUND

1. Technical Field

The present invention relates to a MIMO transmission apparatus and MIMO transmission method for transmitting SC-FDMA signals in particular.

2. Description of the Related Art

In 3GPP-LTE, an SC-FDMA (Single-Carrier Frequency Division Multiple Access) is adopted as an uplink communication scheme (see Non-Patent Literature 1). With SC-FDMA, N symbols modulated by a predetermined modulation scheme (e.g., QPSK) on the time axis are separated in a plurality of frequency components, mapped on different subcarriers between frequency components and, after being changed back to a time domain waveform, attached a CP (Cyclic Prefix), thereby forming an SC-FDMA symbol. That is, one SC-FDMA symbol includes N time continuous signals and CP.

Also, in 3GPP-LTE, a radio communication base station apparatus (hereinafter simply "base station") allocates resources for uplink data to a radio communication terminal apparatus (hereinafter simply "terminal") via a physical channel (e.g., PDCCH).

Upon receiving information about allocation of the resources for uplink data, the terminal transmits data stored in its buffer using these resources.

Also, in 3GPP-LTE, ARQ (Automatic Repeat reQuest) is applied to downlink data from a base station to a terminal. That is, the terminal feeds back a response signal indicating the error detection result of downlink data to the base station. The terminal performs CRC (Cyclic Redundancy Check) check of the downlink data and feeds back an ACK (ACKnowledgment) when CRC=OK (no error) or feeds back a NACK (Negative ACKnowledgment) when CRC=NG (error present), to the base station as a response signal.

Therefore, a case occurs where, while transmission data stored in a buffer, the terminal has to transmit a response signal (i.e., ACK/NACK signal) for downlink data received four subframes before. In this case, on the terminal side, an ACK/NACK signal is placed on resources on which uplink data should be originally placed (see Non-Patent Literature 2).

FIG. 1 shows slots on which an ACK/NACK signal is placed. In FIG. 1, above "N" is 12, and a CP is not illustrated for each explanation. Also, one slot is formed with seven SC-FDMA symbols. Also, normally, although an ACK/NACK signal transmitted in uplink is maximum one symbol in one subframe, to increase the reception power of an ACK/NACK signal in a base station on the receiving side, an ACK/NACK signal is repeatedly transmitted eight times (i.e., eight symbols) every one slot in FIG. 1. That is, an ACK/NACK signal is transmitted four times in the SC-FDMA symbol immediately before the reference signal and four times in the SC-FDMA symbol immediately after the reference signal.

Also, 3GPP LTE-advanced standardization has been started to realize faster communication. in 3GPP LTE-advanced, to realize the uplink transmission speed of about maximum 500 Mbps, a technique of uplink spatial multiplexing (i.e., MIMO: Multiple Input Multiple Output) is expected to be adopted.

FIG. 2 is a block diagram showing a configuration example of a MIMO transmission apparatus. In FIG. 2, as in 3GPP-LTE, a data signal to be spatially multiplexed is received as input in a precoding section while maintaining a single carrier characteristic. The precoding section performs a precoding operation of two items of input stream data and outputs the results to DFT sections associated with respective antennas. Also, transmitting two items of stream data at the same time is defined as "RANK 2 transmission." By contrast with this, in 3GPP-LTE shown in FIG. 1, "RANK 1 transmission" by means of one stream is performed. Also, it is presumed that a terminal has one transmission antenna in 3GPP-LTE, and therefore precoding processing is not performed in 3GPP-LTE.

Then, the DFT sections transform input signals on the frequency axis and output a plurality of resulting frequency components to frequency mapping sections. These plurality of frequency components are mapped on appropriate frequency positions by frequency mapping sections and made time domain waveforms by IFFT sections. The time domain waveforms obtained as above are transmitted via RF circuits and antennas.

CITATION LIST

Non-Patent Literature

[NPL 1]
3GPP TS 36.211 V8.3.0, "Physical Channels and Modulation (Release 8)," May 2008

[NPL 2]
3GPP TS 36.212 V8.3.0, "Multiplexing and Channel Coding (Release 8)," May 2008

BRIEF SUMMARY

Technical Problem

Here, in a case of transmitting an ACK/NACK signal in RANK 2 transmission, first, a method of mapping an ACK/NACK signal only on one stream is possible, and, second, a method of mapping an ACK/NACK signal on both two streams is possible.

FIG. 3 illustrates a method of mapping an ACK/NACK signal only on one stream. In the case of RANK 2, $S_{data}$ representing a modulated data sequence is represented by a vector of two rows and one column (2×1). Also, it is normally assumed that a terminal has two transmission antennas, precoding matrix $\Phi_{data}$ is represented by a 2×2 matrix.

Also, an ACK/NACK signal vector is represented by a 2×1 matrix. However, an ACK/NACK signal is mapped only on one stream and zero is mapped on the other stream to prevent inter-stream interference. That is, when a modulated ACK/NACK signal is $S_{ack}$, an ACK/NACK signal vector is represented by $(S_{ack}, 0)$.

Here, when precoding matrix $\Phi_{data}=\frac{1}{2}\times(1,1;1,-1)$, precoded ACK/NACK signal vector $X_{ack}$ is represented by equation 1.

(Equation 1)

$$x_{ack} = \Phi_{data}\begin{pmatrix} s_{ack} \\ 0 \end{pmatrix} = \frac{1}{2}\begin{pmatrix} 1 & 1 \\ 1 & -1 \end{pmatrix}\begin{pmatrix} s_{ack} \\ 0 \end{pmatrix} = \frac{1}{2}\begin{pmatrix} s_{ack} \\ s_{ack} \end{pmatrix} \quad [1]$$

Then, as described above, this ACK signal vector $X_{ack}$ is included in two SC-FDMA symbols in one slot and transmitted eight times in total.

Thus, an ACK/NACK signal is transmitted without spatial multiplexing, so that it is possible to reduce interference given to an ACK/NACK signal. Therefore, the accuracy of receiving an ACK/NACK signal improves.

However, ACK signal vector $X_{ack}$ includes weighting per transmission antenna, and therefore a beam-forming effect occurs in an ACK/NACK signal. Accordingly, there is a possibility that an ACK/NACK signal does not arrive at a terminal by predetermined power depending on the direction of the formed beam. That is, depending on the beam-forming effect, there arises a problem that the reception quality of an ACK/NACK signal degrades.

Also, FIG. 4 illustrates a method of mapping an ACK/NACK signal on both two streams. To prevent inter-stream interference and increase the power of an ACK/NACK signal, the same ACK/NACK signal is mapped on two streams. That is, an ACK/NACK signal vector in this case is represented by $(S_{ack}, S_{ack})$.

In this case, when the same precoding matrix is used, precoded ACK/NACK signal vector $X_{ack}$ is represented by equation 2.

(Equation 2)

$$x_{ack} = \Phi_{data}\begin{pmatrix} s_{ack} \\ s_{ack} \end{pmatrix} = \frac{1}{2}\begin{pmatrix} 1 & 1 \\ 1 & -1 \end{pmatrix}\begin{pmatrix} s_{ack} \\ s_{ack} \end{pmatrix} = \begin{pmatrix} s_{ack} \\ 0 \end{pmatrix} \quad [2]$$

As seen from equation 2, one element of precoded ACK/NACK signal vector $X_{ack}$ is zero. That is, in this case, it follows that an ACK/NACK signal is transmitted only from one antenna. Therefore, depending on the transmission path condition, there arises a problem that the reception quality of an ACK/NACK signal degrades.

It is therefore an object of the present invention to provide a MIMO transmission apparatus and MIMO transmission method for improving the reception quality of a response signal in a case where the first and second elements of a response signal vector formed based on the response signal are included in the same subframe and then transmitted.

Solution to Problem

The MIMO transmission apparatus of the present invention that maps first and second elements of a response signal vector formed based on a response signal on first and second streams, respectively, includes the first and second elements in two frequency division multiple access (FDMA) symbols in one subframe and performs transmission, employs a configuration having: a forming section that forms response signal vectors based on the response signal and makes a response signal vector in a first FDMA symbol and a response signal vector in a second FDMA symbol orthogonal; and a precoding section that performs precoding of the formed response signal vectors by a matrix multiplying a unitary matrix by a constant number.

The MIMO transmission method of the present invention for mapping first and second elements of a response signal vector formed based on a response signal on first and second streams, respectively, including the first and second elements in two frequency division multiple access (FDMA) symbols in one subframe and performing transmission, includes the steps of: forming response signal vectors based on the response signal; and performing precoding of the formed response signal vectors by a matrix multiplying a unitary matrix by a constant number, where a response signal vector in a first FDMA symbol and a response signal vector in a second FDMA symbol are orthogonal.

Advantageous Effects of Invention

According to the present invention, it is possible to provide a MIMO transmission apparatus and MIMO transmission method for improving the reception quality of a response signal.

DETAILED DESCRIPTION

Figure 1:
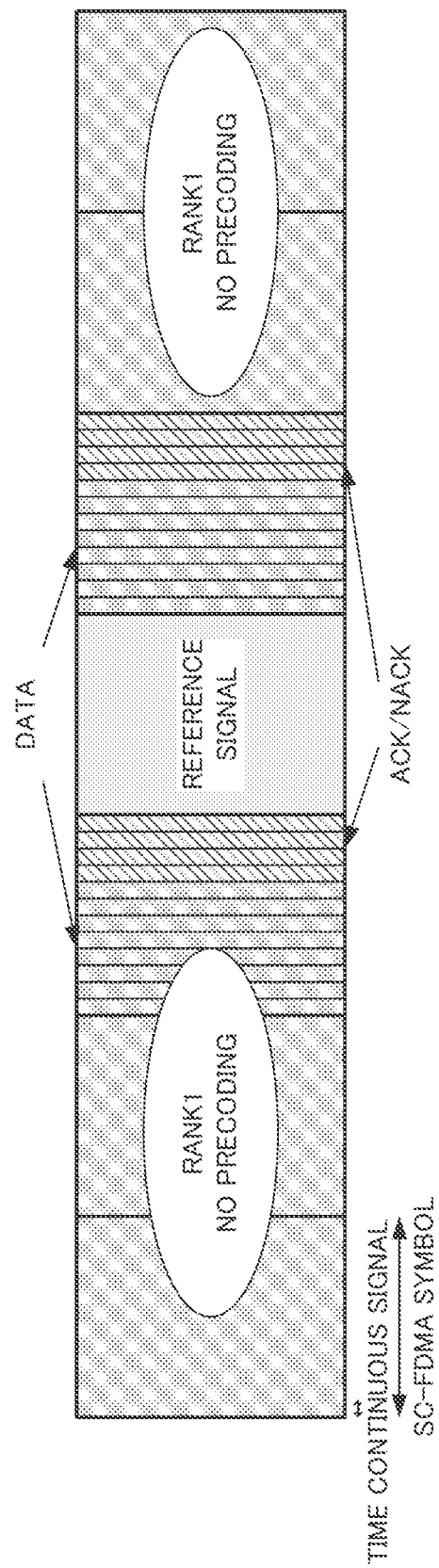
FIG. 1 shows a conventional slot in which an ACK/NACK signal is placed.

Now, embodiments of the present invention will be explained in detail with reference to the accompanying drawings. Also, in the embodiments, the same components will be assigned the same reference numerals and overlapping explanation will be omitted.

Embodiment 1

[Terminal Configuration]

Figure 5:
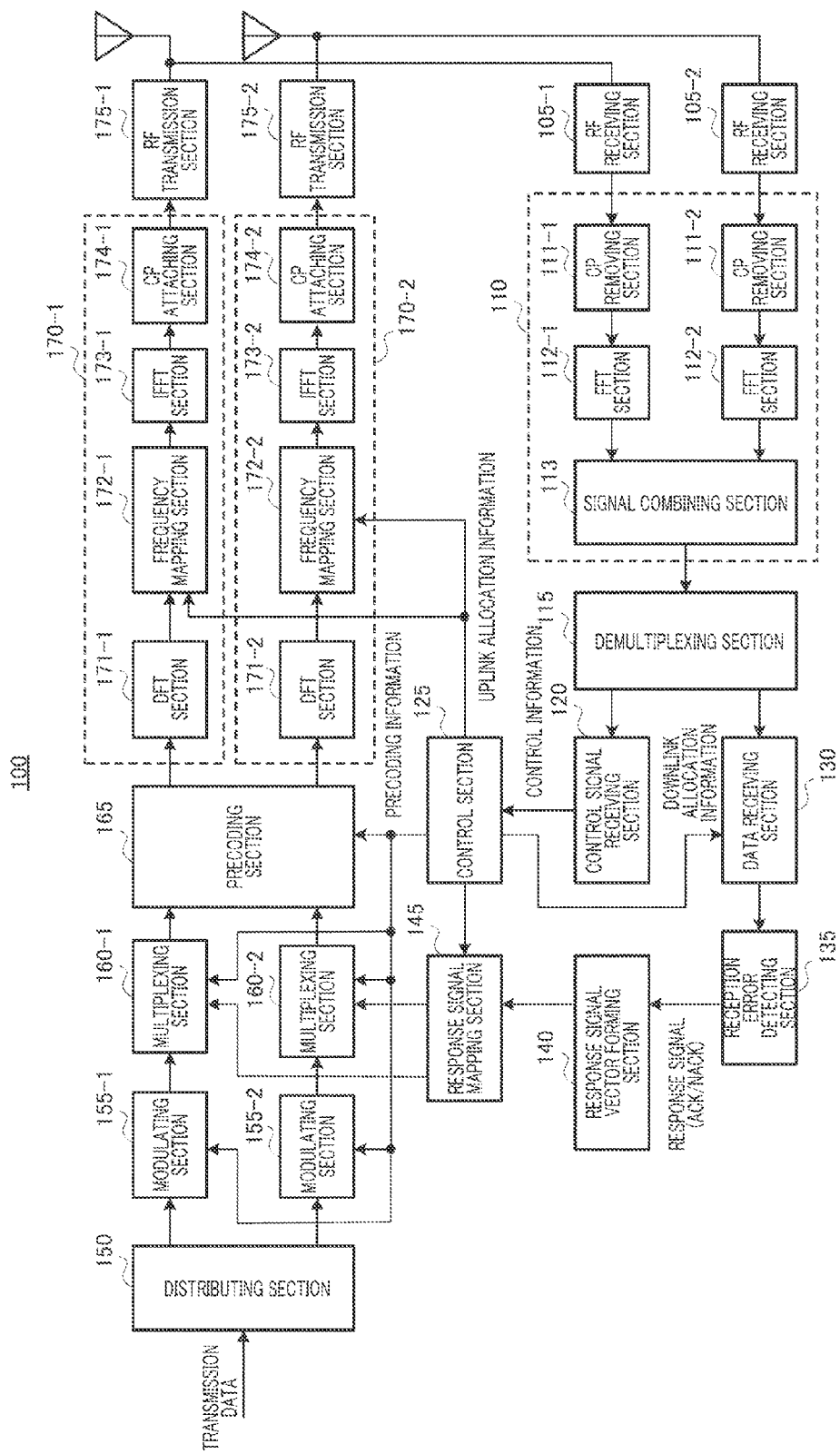
FIG. 5 is a block diagram showing a configuration of a terminal according to Embodiment 1 of the present invention.

FIG. 5 is a block diagram showing a configuration of terminal 100 according to Embodiment 1 of the present invention. In FIG. 5, terminal 100 is provided with RF receiving sections 105-1 and 105-2, OFDM (Orthogonal Frequency Division Multiple) signal demodulating section 110, demultiplexing section 115, control signal receiving section 120, control section 125, data receiving section 130, reception error detecting section 135, response signal vector forming section 140, response signal mapping section 145, distributing section 150, modulating sections 155-1 and 155-2, multiplexing sections 160-1 and 160-2, precoding section 165, SC-FDMA signal forming sections 170-1 and 170-2 and RF transmission sections 175-1 and 175-2. Also, in FIG. 5, terminal 100 that is a MIMO transmission apparatus has a plurality of antennas, and function blocks with a code branch number of "1." are associated with the first antenna and function blocks with a branch number of "2" are associated with the second antenna.

RF receiving sections 105-1 and 105-2 perform radio reception processing (such as down-conversion, analog-to-digital (A/D) conversion) on radio reception signals received via respective antennas and output resulting reception signals to OFDM signal demodulating section 110.

OFDM signal demodulating section 110 is provided with CP (Cyclic Prefix) removing sections 111-1 and 111-2, fast Fourier transform ("FFT") sections 112-1 and 112-2 and signal combining section 113. OFDM signal demodulating section 110 receives reception OFDM signals from each of RF receiving sections 105-1 and 105-2. In OFDM signal demodulating section 110, CP removing sections 111-1 and 111-2 remove a CP from the reception OFDM signals, and FFT sections 112-1 and 112-2 convert the reception OFDM signals without a CP into frequency domain signals, respectively. Then, signal combining section 113 combines the frequency domain signals obtained in FFT section 112-1 and 112-2 every frequency component, and obtains a parallel signal. Further, signal combining section 113 performs parallel-to-serial conversion of the parallel signal and outputs the resulting serial signal to demultiplexing section 115 as a reception signal.

Demultiplexing section 115 demultiplexes the reception signal received from OFDM signal demodulating section 110 into the control signal and the data signal included in that reception signal. The control signal is outputted to control signal receiving section 120 and the data signal is outputted to data receiving section 130.

Control signal receiving section 120 receives the control signal from demultiplexing section 120. This control signal includes uplink allocation information and downlink allocation information. Control signal receiving section 120 extracts and outputs the uplink allocation information and the downlink allocation information to control section 125.

Control section 125 generates a data reception control signal based on the downlink allocation information received from control signal receiving section 120 and outputs this signal to data receiving section 130.

Also, control section 125 determines the MCS (Modulation and Coding Scheme) of the data signal based on the uplink allocation information. Further, according to the determined MCS, control section 125 determines the number of times to repeat placing an ACK/NACK signal vector in one SC-FDMA symbol.

Data receiving section 130 receives the data signal from demultiplexing section 115. Then, data receiving section 130 decodes the data signal for the subject device based on the data reception control signal received from control section 125.

Reception error detecting section 135 decides whether decoding succeeded or decoding failed, based on the decoding result of data receiving section 130, and generates a response signal for this decision result, that is, generates an ACK/NACK signal. That is, an ACK is generated when decoding succeeded, or a NACK is generated when decoding failed. This ACK/NACK signal is outputted to response signal vector forming section 140.

Response signal vector forming section 140 forms ACK/NACK signal vectors based on the ACK/NACK signal. Response signal vector forming section 140 generates the first ACK/NACK signal vector and a second ACK/NACK signal vector, which are orthogonal to each other.

Response signal mapping section 145 maps the first and second elements of the first ACK/NACK signal vector (or second ACK/NACK signal vector) formed in response signal vector forming section 140, on the first stream and second stream, respectively. Response signal mapping section 145 maps the first ACK/NACK signal vector on the symbol corresponding to the first SC-FDMA symbol and maps the second ACK/NACK signal vector on the symbol corresponding to a second SC-FDMA symbol in the same slot as that of the first SC-FDMA symbol. Response signal mapping section 145 repeats mapping the first ACK/NACK signal vector and the second ACK/NACK signal vector for the number of times of repetitions determined in control section 125.

Distributing section 150 receives a transmission data sequence and distributes the input transmission data sequence into two data streams. This is because terminal 100 transmits transmission data by spatial multiplexing.

Modulating sections 155-1 and 155-2 modulate two data streams based on a directive from control section 125 and output the results to multiplexing sections 160-1 and 160-2.

Multiplexing sections 160-1 and 160-2 time-multiplex the data signals received from modulating sections 155-1 and 155-2 and the ACK/NACK signal vectors received from response signal mapping section 145, according to a directive from control section 125.

Precoding section 165 receives as input the first stream and the second stream by which the ACK/NACK signal vectors are multiplexed in multiplexing sections 160-1 and 160-2, and applies precoding processing based on a directive of control section 125 to the first stream and the second stream. Precoding section 165 performs precoding processing using a matrix multiplying a 2×2 unitary matrix by a constant number. The first stream and the second stream subjected to precoding processing are outputted to SC-FDMA signal forming sections 170-1 and 170-2, respectively.

Figure 2:
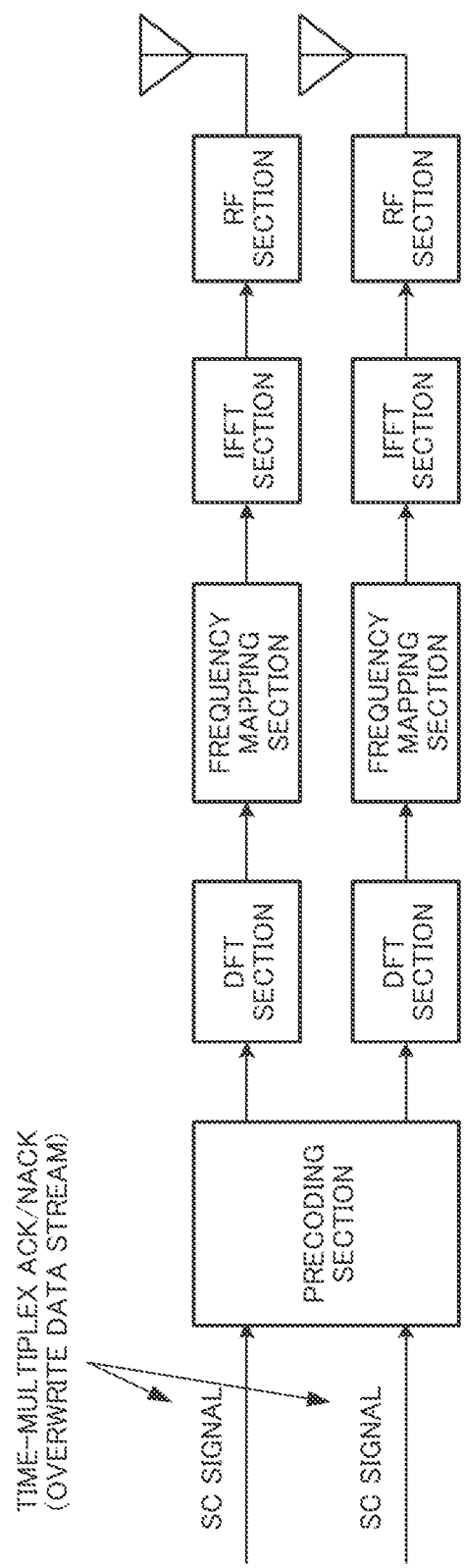
FIG. 2 is a block diagram showing a configuration example of a conventional MIMO transmission apparatus.
Figure 3:
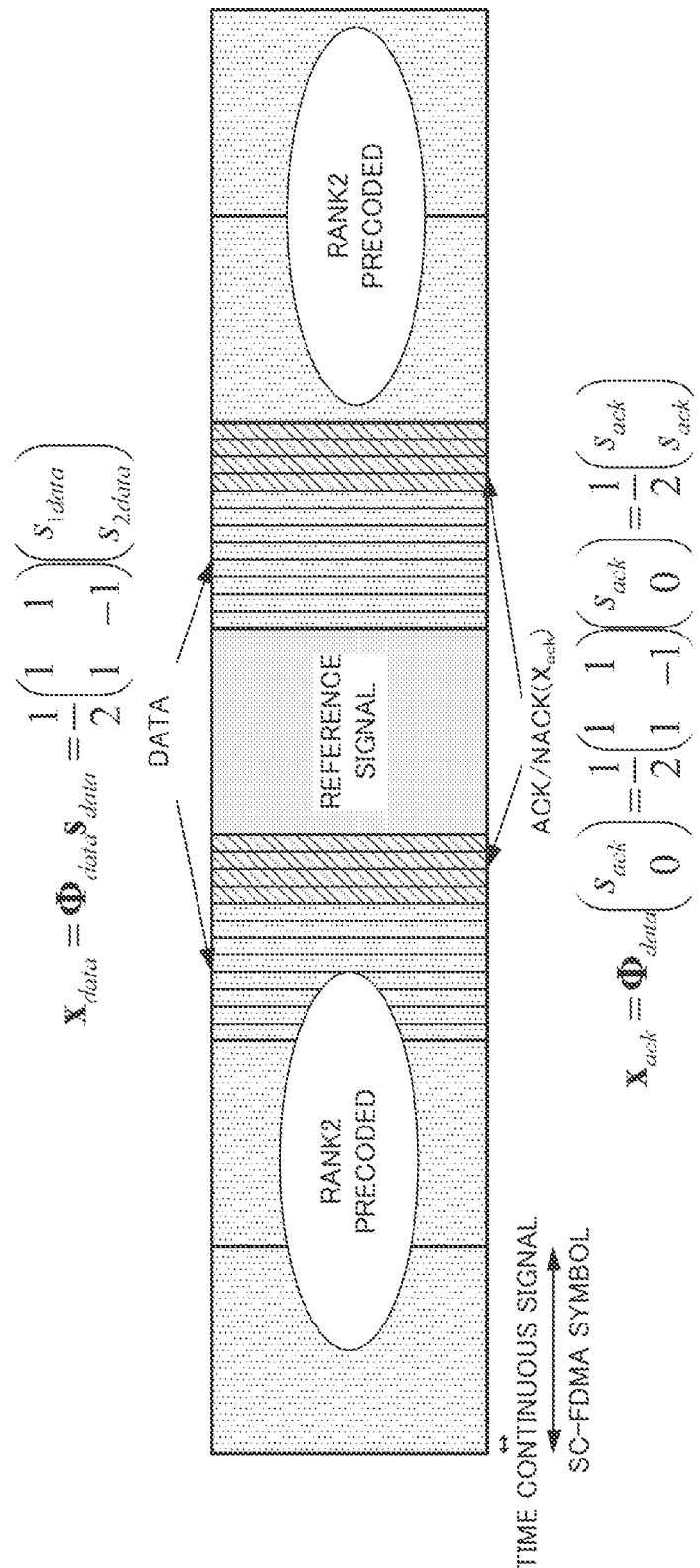
FIG. 3 illustrates a method (or associated technique) of mapping an ACK/NACK signal on one stream.
Figure 4:
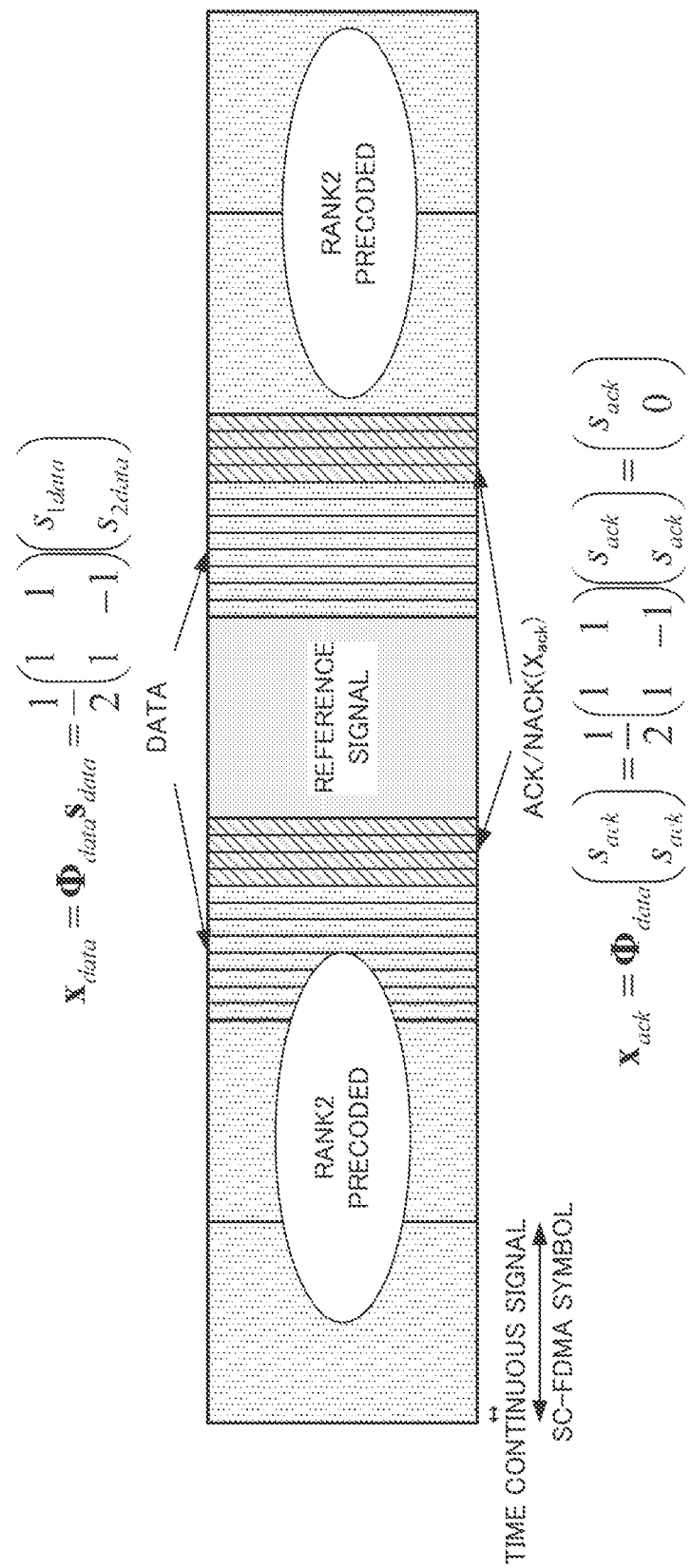
FIG. 4 illustrates a method (or associated technique) of mapping an ACK/NACK signal on both two streams.

SC-FDMA signal forming sections 170-1 and 170-2 receive as input the first stream and the second stream subjected to precoding processing and form SC-FDMA signals from the input streams. SC-FDMA signal forming section 170-1 has discrete Fourier transform ("DFT") section 171-1, frequency mapping section 172-1, IFFT section 173-1 and CP attaching section 174-1. SC-FDMA signal forming section 170-2 has DFT section 171-2, frequency mapping section 172-2, IFFT (Inverse Fast Fourier Transform) section 173-2 and CP attaching section 174-2. Processing in SC-FDMA signal forming sections 170-1 and 170-2 is the same as the processing explained in FIG. 2.

RF transmission sections 175-1 and 175-2 perform radio transmission processing of the SC-FDMA signals formed in SC-FDMA signal forming sections 170-1 and 170-2, respectively, and transmit the results via antennas.

[Base Station Configuration]

Figure 6:
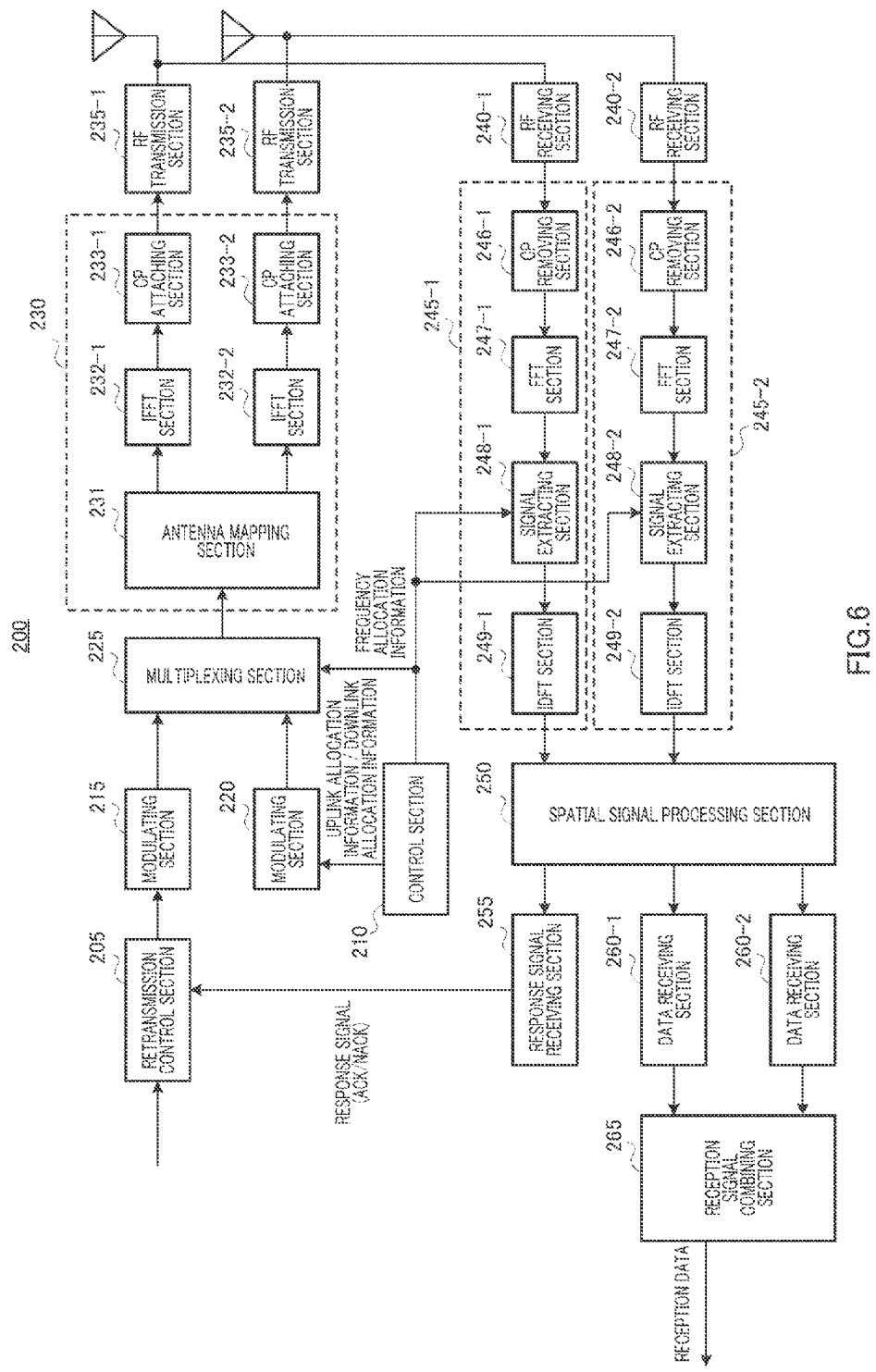
FIG. 6 is a block diagram showing a configuration of a base station according to Embodiment 1 of the present invention.

FIG. 6 is a block diagram showing a configuration of base station 200 according to Embodiment 1 of the present invention. In FIG. 6, base station 200 is provided with retransmission control section 205, control section 210, modulating sections 215 and 220, multiplexing section 225, OFDM signal forming section 230, RF transmission sections 235-1 and 235-2, RF receiving sections 240-1 and 240-2, SC-FDMA signal demodulating sections 245-1 and 245-2, spatial signal processing section 250, response signal receiving section 255, data receiving sections 260-1 and 260-2 and reception signal combining section 265. Also, in FIG. 6, base station 200 that is a MIMO receiving apparatus has a plurality of antennas, and function blocks with a code branch number of "1" are associated with the first antenna, and function blocks with a branch number of "2" are associated with a second antenna.

Retransmission control section 205 receives new transmission data as input and holds the new transmission data as well as outputs an ACK signal associated with the previous transmission data to modulating section 215 as a trigger. Also, upon receiving a NACK signal from response signal receiving section 255, retransmission control section 205 outputs the held transmission data to modulating section 215 for retransmission.

Control section 210 generates allocation information (including uplink allocation information and downlink allocation information) transmitted via a PDCCH (Physical Downlink Control CHannel) and outputs this allocation information to modulating section 220, Also, control section 210 outputs frequency allocation information (including uplink frequency allocation information and downlink allocation frequency information) of frequencies allocated to terminal 100, which is the transmission destination of allocation information, to multiplexing section 225 and SC-FDMA signal demodulating section 245.

Modulating section 215 modulates the transmission data received from retransmission control section 205 and outputs a modulation signal to multiplexing section 225.

Modulating section 220 modulates allocation information received from control section 210 and outputs a modulation signal to multiplexing section 225.

Multiplexing section 225 places the modulation signal of transmission data received from modulating section 215 and the modulation signal of control data received from modulating section 220 in resources respectively corresponding to a PDSCH (Physical Downlink Shared CHannel) and a PDCCH, time-multiplexes the results and outputs a resulting multiplex signal to OFDM signal forming section 230.

OFDM signal forming section 230 receives the multiplex signal from multiplexing section 225, makes this multiplex signal a plurality of stream signals and forms OFDM signals from each of the plurality of stream signals.

To be more specific, OFDM signal forming section 230 has antenna mapping section 231, IFFT sections 232-1 and 232-2 and CP attaching sections 233-1 and 233-2. In OFDM signal forming section 230, antenna mapping section 231 performs serial-to-parallel conversion of the input multiplex signal and thereby forms a plurality of stream signals. Then, IFFT sections 232-1 and 232-2 perform an IFFT of these stream signals and thereby form OFDM signals. These OFDM signals are attached a CP in CP attaching sections 233-1 and 233-2.

RF transmission sections 235-1 and 235-2 perform radio transmission processing on the OFDM signals formed in OFDM signal forming section 230 and transmit the resulting radio signals via antennas.

RF receiving sections 240-1 and 240-2 receive uplink radio signals transmitted from terminal 100 by respective antennas. RF receiving sections 240-1 and 240-2 perform radio reception processing of the radio reception signals and output the resulting baseband signals to SC-FDMA signal demodulating-sections 245-1 and 245-2. Here, in uplink, as described above, SC-FDMA signals are transmitted.

SC-FDMA signal demodulating sections 245-1 and 245-2 demodulate the reception SC-FDMA signals received from RF receiving sections 240-1 and 240-2. To be more specific, CP removing sections 246-1 and 246-2 remove a CP from the reception SC-FDMA signals and FFT sections 247-1 and 247-2 convert the reception SC-FDMA signals without a CP into frequency domain signals. Then, signal extracting sections 248-1 and 248-2 extract frequency components corresponding to the frequency allocation information received from control section 210, from the frequency domain signals, and convert the extracted frequency components into single carrier signals on the time axis, and IDFT sections 249-1 and 249-2 convert the extracted frequency components into single carrier signals on the time axis.

Spatial signal processing section 250 applies equalization processing by an algorithm such as MMSE to the single carrier signal extracted per terminal 100. By this means, two items of stream information from which inter-stream interference is removed are outputted to data receiving sections 260-1 and 260-2. Also, if an ACK/NACK signal is multiplexed by an uplink signal, the ACK/NACK signal is outputted from spatial signal processing section 250 to response signal receiving section 255.

Response signal receiving section 255 combines ACK/NACK signals repeated two times in one slot (i.e., ACK/NACK signals included in two SC-FDMA symbols in one slot) by, for example, maximum ratio combining. Then, based on the combined signal, response signal receiving section 255 decides whether the ACK/NACK signal indicates an ACK or the ACK/NACK signal indicates a NACK, and outputs an ACK signal or a NACK signal to retransmission control section 205 based on the decision result.

Data receiving sections 260-1 and 260-2 demodulate and decode two single carrier signals demultiplexed in spatial signal processing section 250.

Reception signal combining section 265 groups the decoded data obtained in data receiving sections 260-1 and 260-2 into one uplink data and transfers the resulting data sequence to a higher layer such as MAC.

[Operations of Terminal 100]

In a case where terminal 100 receives a directive from a base station so as to transmit uplink data in RANK 2 at the timing when a response signal for downlink data should be transmitted (i.e., in a case of receiving a control signal associated with uplink allocation), by placing a data signal in a slot and then overwriting the data signal part by an ACK/NACK signal, terminal 100 transmits the data signal and the ACK/NACK signal in the same slot. At this time, an uplink data signal is punctured, and, actually, the coding rate of the data signal increases slightly.

First, in terminal 100, control section 125 determines the MCS (Modulation and Coding Scheme) of a data signal based on uplink allocation information. Also, control section 125 determines the number of times to repeat placing an ACK/NACK signal vector in one SC-FDMA symbol, based on the determined MCS. Here, an ACK/NACK signal is placed in two SC-FDMA symbols every one slot, and one subframe to transmit an uplink data signal is formed with two slots. Therefore, the number of times an ACK/NACK signal is repeatedly placed every one subframe is an integral multiple of 4.

Also, response signal vector forming section 140 forms the first ACK/NACK signal vector and a second ACK/NACK signal vector that are orthogonal to each other, based on ACK/NACK signals.

Then, response signal mapping section 145 maps the first ACK/NACK signal vector on the symbol corresponding to the first SC-FDMA symbol for the number of times of repetitions determined in control section 125, and maps the second ACK/NACK signal vector on the symbol corresponding to the second SC-FDMA symbol in the same slot as that of the first SC-FDMA symbol, for the number of times of repetitions determined in control section 125. Also, as described above, the first and second elements of the first ACK/NACK signal vector (or second ACK/NACK signal vector) are mapped on the first stream and the second stream, respectively.

Then, precoding section 165 multiplies the input first stream and second stream by a precoding matrix. As this precoding matrix, a matrix multiplying a 2×2 unitary matrix by a constant number is used. Also, a precoding matrix used for data signals and a precoding matrix used for ACK/NACK signals are the same.

Then, SC-FDMA signal forming sections 170-1 and 170-2 form SC-FDMA signals from the first stream and second stream subjected to precoding, respectively.

Figure 7:
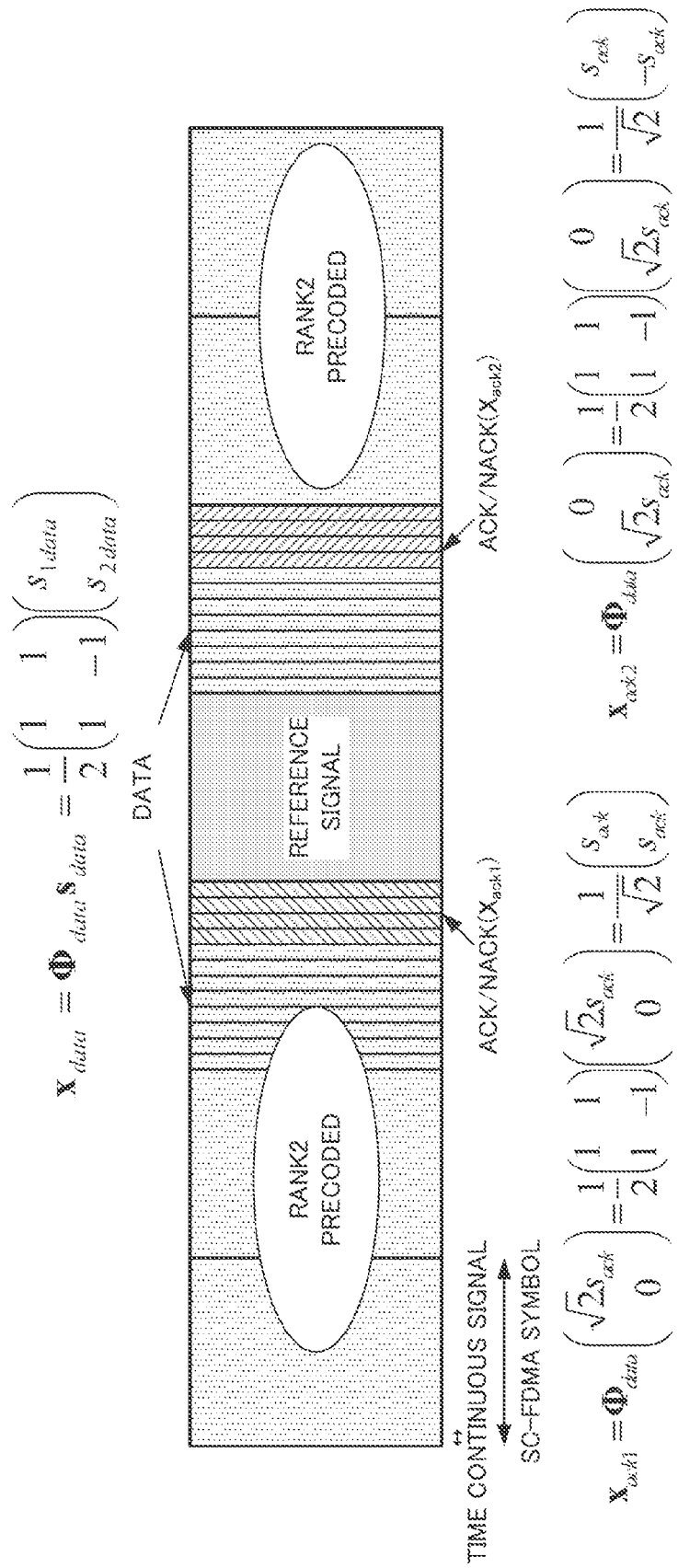
FIG. 7 shows an SC-FDMA signal over one slot in a case where the number of times to repeat placing an ACK/NACK signal vector in one SC-FDMA symbol is four.

FIG. 7 shows an SC-FDMA signal over one slot in a case where the number of times to repeat placing an ACK/NACK signal vector in one SC-FDMA symbol is four.

Here, as shown in FIG. 7, in Embodiment 1, the first ACK/NACK signal vector is represented by ($aS_{ack}$, 0), and the second ACK/NACK signal vector is represented by (0, $aS_{ack}$). Further, "a" is not 1 but $\sqrt{2}$.

That is, multiplexing section 160-1 overwrites a data signal of the symbol corresponding to the first SC-FDMA symbol by $aS_{ack}$ that is the first element of the first ACK/NACK signal vector, and overwrites a data signal of the symbol corresponding to the second SC-FDMA symbol by 0 that is the first element of the second ACK/NACK signal vector. Multiplexing section 160-2 overwrites a data signal of the symbol corresponding to the first SC-FDMA symbol by 0 that is the second element of the first ACK/NACK signal vector, and overwrites a data signal of the symbol corresponding to the second SC-FDMA symbol by $aS_{ack}$ that is the second element of the second ACK/NACK signal vector.

Further, response signal vector forming section 140 forms ACK/NACK signal vectors having, as elements, ACK/NACK signals whose amplitude value is multiplied by $\sqrt{2}$.

Also, a precoding matrix used in Embodiment 1 is $\Phi_{data}=\frac{1}{2}\times(1,1;1,-1)$ that is a matrix multiplying a unitary matrix by a constant number.

Also, the first SC-FDMA symbol is the SC-FDMA symbol immediately before the fourth SC-FDMA symbol from the slot head in which a reference signal is placed, and the second SC-FDMA symbol is the SC-FDMA symbol immediately after the fourth SC-FDMA symbol from the slot head.

Also, the first ACK/NACK signal vector is repeatedly mapped on the last four symbols of the symbol sequence corresponding to the first SC-FDMA symbol. That is, the first ACK/NACK signal vector represents four time continuous signals in the tail end of the first SC-FDMA symbol. Also, the second ACK/NACK signal vector is repeatedly mapped on the last four symbols of the symbol sequence corresponding to the second SC-FDMA symbol. That is the second ACK/NACK signal vector represents four time continuous signals in the tail end of the second SC-FDMA symbol.

Under the above conditions, precoded first ACK/NACK signal vector $X_{ack1}$ included in the first SC-FDMA symbol is represented by following equation 3.

(Equation 3)

$$x_{ack1} = \Phi_{data}\begin{pmatrix}\sqrt{2}s_{ack}\\0\end{pmatrix} = \frac{1}{2}\begin{pmatrix}1 & 1\\1 & -1\end{pmatrix}\begin{pmatrix}\sqrt{2}s_{ack}\\0\end{pmatrix} = \frac{1}{\sqrt{2}}\begin{pmatrix}s_{ack}\\s_{ack}\end{pmatrix} \quad [3]$$

Also, precoded second ACK/NACK signal vector $X_{ack2}$ included in the second SC-FDMA symbol is represented by following equation 4.

(Equation 4)

$$x_{ack2} = \Phi_{data}\begin{pmatrix}0\\\sqrt{2}s_{ack}\end{pmatrix} = \frac{1}{2}\begin{pmatrix}1 & 1\\1 & -1\end{pmatrix}\begin{pmatrix}0\\\sqrt{2}s_{ack}\end{pmatrix} = \frac{1}{\sqrt{2}}\begin{pmatrix}s_{ack}\\-s_{ack}\end{pmatrix} \quad [4]$$

As seen from equations 3 and 4, precoded first ACK/NACK signal vector $X_{ack1}$ and precoded second ACK/NACK signal vector $X_{ack2}$ are orthogonal to each other, so that it is possible to obtain the spatial diversity effect. That is, $X_{ack1}$ and $X_{ack2}$ have the beam-forming effect by orthogonal beams, so that the base station side can receive one of the ACK/NACK signal vectors with high quality. Therefore, it is possible to prevent degradation in reception quality due to the beam-forming effect.

Also, by multiplying an ACK/NACK signal having the same power as that of the data signal mapped in each stream by $\sqrt{2}$, if one element of the ACK/NACK signal is made "0," it is possible to make the transmission power of the ACK/NACK signal vector equal to the transmission power of the data signal.

As described above, according to the present embodiment, terminal 100 that is a MIMO transmission apparatus maps the first and second elements of ACK/NACK signal vectors formed based on ACK/NACK signals on the first and second streams, respectively, includes these in two SC-FDMA symbols in one slot and transmits the result. In that terminal 100, response signal vector forming section 140, which forms ACK/NACK signal vectors based on ACK/NACK signals, forms (a·$S_{ack}$, 0) as an ACK/NACK signal vector in the first SC-FDMA symbol and forms (0, a·$S_{ack}$) as an ACK/NACK signal vector in the second SC-FDMA symbol, and precoding section 165 performs precoding of the ACK/NACK signal vectors formed in response signal vector forming section 140 by a matrix multiplying a unitary matrix by a constant number.

By this means, it is possible to prevent degradation in reception quality due to the beam-forming effect and ideally obtain the spatial diversity effect. Also, in contrast, if (0, a·$S_{ack}$) is used as an ACK/NACK signal vector in the first SC-FDMA symbol and (a·$S_{ack}$, 0) is used as an ACK/NACK signal vector in the second SC-FDMA symbol, it is possible to provide the same effect.

Here, these effects are obtained by the fact that a matrix multiplying a unitary matrix by a constant number, in which component row vectors are orthogonal, is used as a precoding matrix, and that the ACK/NACK signal vector in the first SC-FDMA symbol and the second ACK/NACK signal vector in the second SC-FDMA symbol are orthogonal.

That is, to provide these effects, an essential requirement is to make the ACK/NACK signal vector in the first SC-FDMA symbol and the ACK/NACK signal vector in the second SC-FDMA symbol orthogonal and perform precoding of the formed ACK/NACK signal vectors by a matrix multiplying a unitary matrix by a constant number.

Also, in terminal 100, response signal vector forming section 140 multiplies an ACK/NACK signal by $\sqrt{2}$.

By this means, even if one element of an ACK/NACK signal vector is made "0," it is possible to make the transmission power of a data signal vector equal to the transmission power of the ACK/NACK signal vector.

Also, although a case of RANK 2 transmission has been described above, the number of spatial multiplexings is not limited to this. For example, uplink transmission may be RANK 4, that is, four-spatial-multiplexing transmission. In this case, an ACK/NACK signal vector in the SC-FDMA symbol immediately before a reference signal in slot 1 is made (a·$S_{ack}$, 0, 0, 0). That is, elements other than the element corresponding to stream 1 are made "0." Then, the ACK/NACK signal vector in the SC-FDMA symbol immediately after the reference signal in slot 1 is made (0, a·$S_{ack}$, 0, 0), the ACK/NACK signal vector in the SC-FDMA symbol immediately before the reference signal in slot 2 is made (0, 0, a·$S_{ack}$, 0), and the ACK/NACK signal vector in the SC-FDMA symbol of the reference signal in slot 2 is made (0, 0, 0, a·$S_{ack}$). By this means, it is possible to provide the same effect as in RANK 2 transmission. Here, in this case, to make the transmission power of a data signal vector equal to the transmission power of an ACK/NACK signal vector, "a" needs to be made 2.

Embodiment 2

Similar to terminal 100 according to Embodiment 1, a terminal according to Embodiment 2 makes an ACK/NACK signal vector in the first SC-FDMA symbol and a second ACK/NACK signal in a second SC-FDMA symbol orthogonal and performs precoding of the formed ACK/NACK signal vectors by a matrix multiplying a unitary matrix by a constant number. Here, the terminal according to Embodiment 2 differs from terminal 100 according to Embodiment 1 in formed ACK/NACK signal vectors. Also, a basic configuration of the terminal according to the present embodiment is the same as the configuration of the terminal explained in Embodiment 1. Therefore, the terminal according to the present embodiment will be explained using FIG. 5.

In terminal 100 according to Embodiment 2, response signal vector forming section 140 forms ACK/NACK signal vectors based on ACK/NACK signals. Response signal vector forming section 140 forms the first ACK/NACK signal vector and a second ACK/NACK signal vector that are orthogonal to each other.

Figure 8:
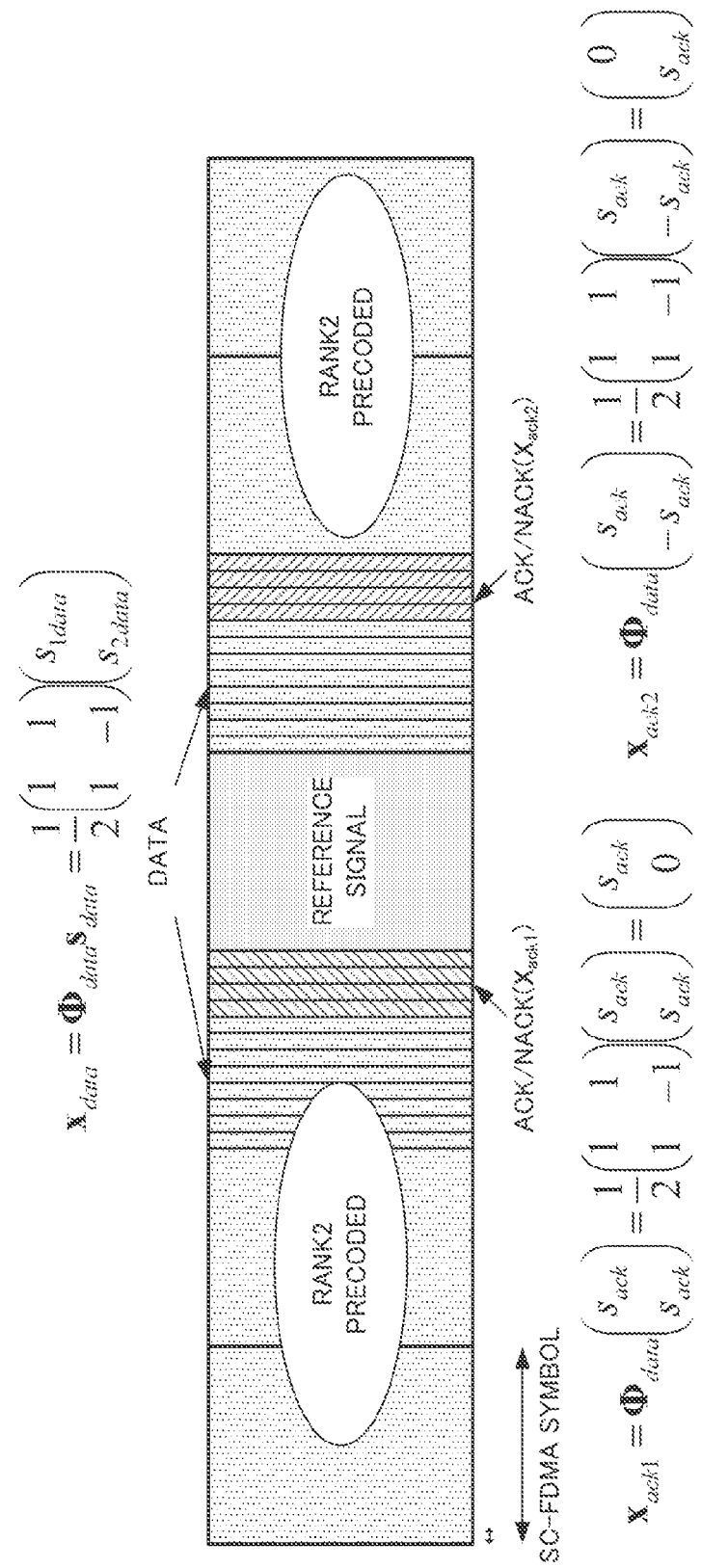
FIG. 8 shows an SC-FDMA signal over one slot in a case where the number of times to repeat placing an ACK/NACK signal vector in one SC-FDMA symbol is four, in Embodiment 2.

FIG. 8 shows an SC-FDMA signal over one slot in a case where the number of times to repeat placing an ACK/NACK signal vector in one SC-FDMA symbol is four, in Embodiment 2.

As shown in FIG. 8, in Embodiment 2, the first ACK/NACK signal vector is represented by ($S_{ack}$, $S_{ack}$) and a second ACK/NACK signal vector is represented by ($S_{ack}$, -$S_{ack}$). That is, in terminal 100 according to Embodiment 2, response signal vector forming section 140 forms the second ACK/NACK signal vector by rotating the constellation of the second element of the first ACK/NACK signal vector by 180 degrees.

That is, precoded first ACK/NACK signal vector $X_{ack1}$ included in the first SC-FDMA symbol is represented by following equation 5.

(Equation 5)

$$x_{ack1} = \Phi_{data}\begin{pmatrix} s_{ack} \\ s_{ack} \end{pmatrix} = \frac{1}{2}\begin{pmatrix} 1 & 1 \\ 1 & -1 \end{pmatrix}\begin{pmatrix} s_{ack} \\ s_{ack} \end{pmatrix} = \begin{pmatrix} s_{ack} \\ 0 \end{pmatrix} \quad [5]$$

Also, precoded second ACK/NACK signal vector $X_{ack2}$ included in the second SC-FDMA symbol is represented by following equation 6.

(Equation 6)

$$x_{ack2} = \Phi_{data}\begin{pmatrix} s_{ack} \\ -s_{ack} \end{pmatrix} = \frac{1}{2}\begin{pmatrix} 1 & 1 \\ 1 & -1 \end{pmatrix}\begin{pmatrix} s_{ack} \\ -s_{ack} \end{pmatrix} = \begin{pmatrix} 0 \\ s_{ack} \end{pmatrix} \quad [6]$$

As seen from equation 5 and equation 6, precoded first ACK/NACK signal vector $X_{ack1}$ and precoded second ACK/NACK signal vector $X_{ack2}$ are orthogonal, so that it is possible to provide the spatial diversity effect.

Also, in contrast, if ($S_{ack}$, -$S_{ack}$) is used as an ACK/NACK signal vector in the first SC-FDMA symbol and ($S_{ack}$, $S_{ack}$) is used as an ACK/NACK signal vector in the second SC-FDMA symbol, it is possible to provide the same effect.

Embodiment 3

Similar to terminal 100 according to Embodiment 1, a terminal according to Embodiment 3 makes an ACK/NACK signal vector in the first SC-FDMA symbol and a second ACK/NACK signal in a second SC-FDMA symbol orthogonal and performs precoding of the formed ACK/NACK signal vectors by a matrix multiplying a unitary matrix by a constant number. Here, the terminal according to Embodiment 3 differs from terminal 100 according to Embodiment 1 in formed ACK/NACK signal vectors. Also, a basic configuration of the terminal according to the present embodiment is the same as the configuration of the terminal explained in Embodiment 1. Therefore, the terminal according to the present embodiment will be explained using FIG. 5, In terminal 100 according to Embodiment 3, response signal vector forming section 140 forms ACK/NACK signal vectors based on ACK/NACK signals. Response signal vector forming section 140 forms the first ACK/NACK signal vector and a second ACK/NACK signal vector that are orthogonal to each other.

Figure 9:
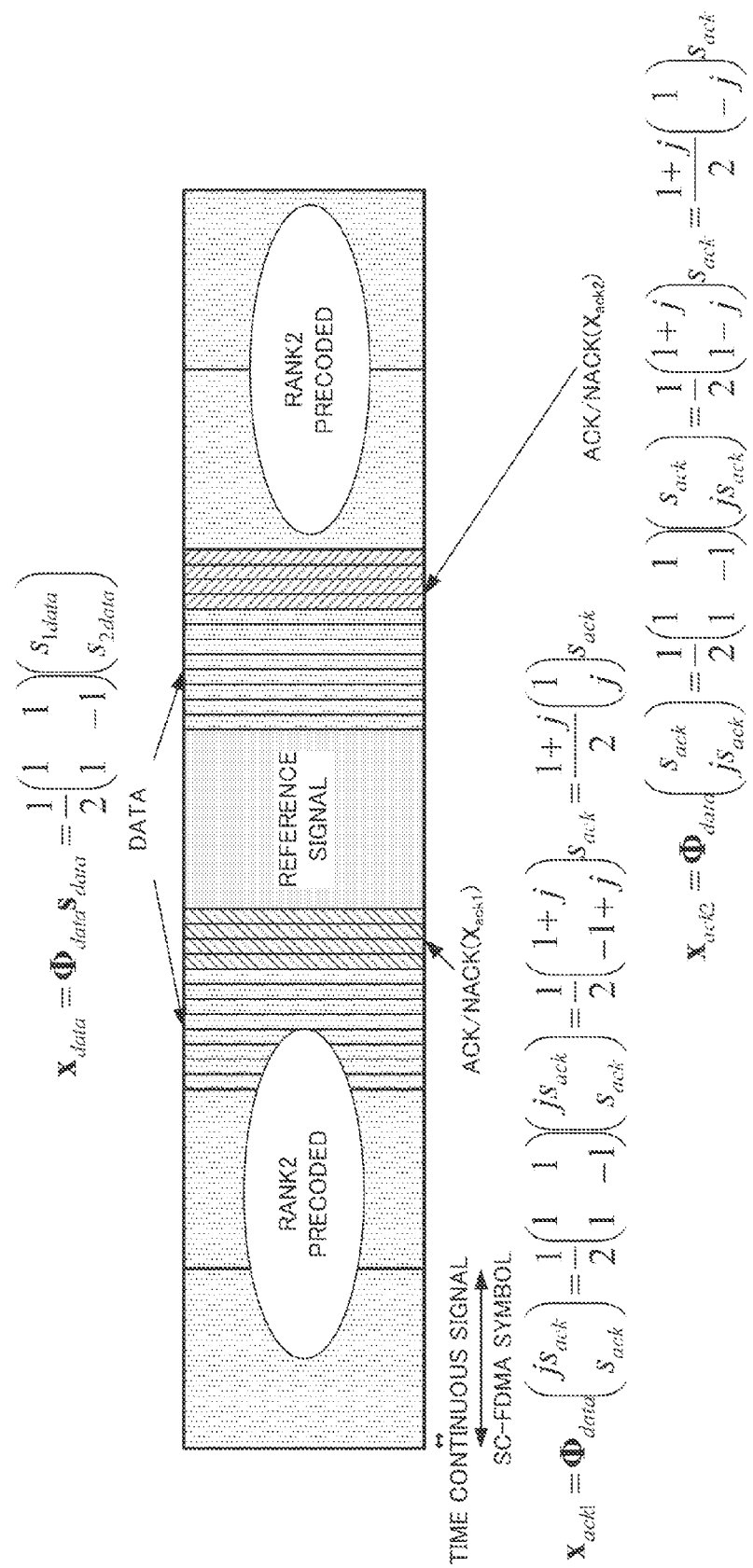
FIG. 9 shows an SC-FDMA signal over one slot in a case where the number of times to repeat placing an ACK/NACK signal vector in one SC-FDMA symbol is four, in Embodiment 3.

FIG. 9 shows an SC-FDMA signal over one slot in a case where the number of times to repeat placing an ACK/NACK signal vector in one SC-FDMA symbol is four, in Embodiment 3.

As shown in FIG. 9, in Embodiment 3, the first ACK/NACK, signal vector is represented by (j·$S_{ack}$, $S_{ack}$) and a second ACK/NACK signal vector is represented by ($S_{ack}$, j·$S_{ack}$). That is, in terminal 100 according to Embodiment 3, response signal vector forming section 140 forms the first ACK/NACK signal vector by rotating the constellation of the first element of ACK/NACK signal vector ($S_{ack}$, $S_{ack}$) by 90 degrees. Also, response signal vector forming section 140 forms the second ACK/NACK signal vector by rotating the constellation of the second element of ACK/NACK signal vector ($S_{ack}$, $S_{ack}$) by 90 degrees. Here, symbols forming the ACK/NACK signal are modulated by BPSK or QPSK. Therefore, processing of rotating a constellation by 90 degrees can be realized only by switching between the I component and the Q component and switching between positivity and negativity. This processing does not require a multiplier, and therefore has a smaller amount of processing.

That is, precoded first ACK/NACK signal vector $X_{ack1}$ included in the first SC-FDMA symbol is represented by following equation 7.

(Equation 7)

$$x_{ack1} = \Phi_{data}\begin{pmatrix} js_{ack} \\ s_{ack} \end{pmatrix} = \frac{1}{2}\begin{pmatrix} 1 & 1 \\ 1 & -1 \end{pmatrix}\begin{pmatrix} js_{ack} \\ s_{ack} \end{pmatrix} = \frac{1}{2}\begin{pmatrix} 1+j \\ -1+j \end{pmatrix}s_{ack} = \frac{1+j}{2}\begin{pmatrix} 1 \\ j \end{pmatrix}s_{ack} \quad [7]$$

Also, precoded second ACK/NACK signal vector $X_{ack2}$ included in the second SC-FDMA symbol is represented by following equation 8.

(Equation 8)

$$x_{ack2} = \Phi_{data}\begin{pmatrix} s_{ack} \\ js_{ack} \end{pmatrix} = \frac{1}{2}\begin{pmatrix} 1 & 1 \\ 1 & -1 \end{pmatrix}\begin{pmatrix} s_{ack} \\ js_{ack} \end{pmatrix} = \frac{1}{2}\begin{pmatrix} 1+j \\ 1-j \end{pmatrix}s_{ack} = \frac{1+j}{2}\begin{pmatrix} 1 \\ -j \end{pmatrix}s_{ack} \quad [8]$$

As seen from equation 7 and equation 8, precoded first ACK/NACK signal vector $X_{ack1}$ and precoded second ACK/NACK signal vector $X_{ack1}$ are orthogonal, so that it is possible to provide the spatial diversity effect. Therefore, it is possible to prevent degradation in reception quality due to the beam-forming effect.

Now, the above will be compared to the case of Embodiment 1. In the case of Embodiment 1, the elements of an ACK/NACK signal vector received as input in precoding section 165 have their amplitude multiplied by $\sqrt{2}$. By contrast with this, in terminal 100 according to Embodiment 3, the signal immediately before a signal received as input in precoding section 165 also satisfies a single carrier characteristic, so that it is possible to suppress the dynamic range of precoding section 165. Therefore, compared to terminal 100 according to Embodiment 1, in terminal 100 according to Embodiment 3, it is possible to reduce the circuit scale of precoding section 165.

Next, comparison with the case of Embodiment 2 will be shown. In the case of Embodiment 2, in a precoded ACK/NACK signal vector, one element is 0. By contrast with this, in terminal 100 according to Embodiment 3, both of the elements of a precoded ACK/NACK signal vector are not 0. Therefore, even if the output side of precoding section 165 has an analog circuit (such as an amplifier provided in RF transmission section 235) that is less robust to rapid fluctuation of amplitude, it is possible to stabilize the operations of that analog circuit.

Figure 10:
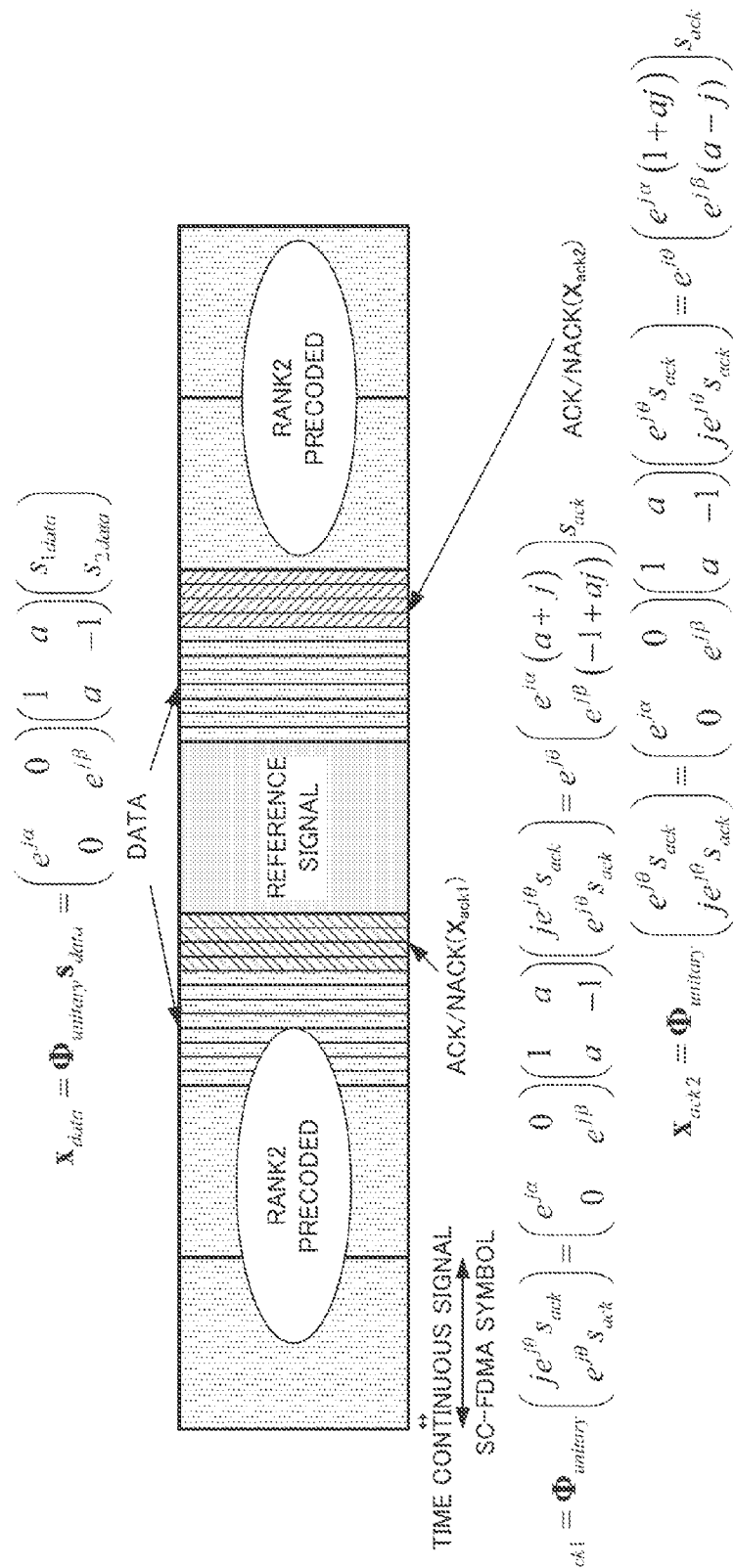
FIG. 10 generalizes FIG. 9 with respect to a precoding matrix.

Also, here, Embodiment 3 is generalized with respect to a precoding matrix. FIG. 10 generalizes FIG. 9 with respect to a precoding matrix.

That is, first, precoding matrix $\Phi_{unitary}$ is represented by equation 9.

(Equation 9)

$$\Phi_{unitary} = \begin{pmatrix} e^{j\alpha} & 0 \\ 0 & e^{j\beta} \end{pmatrix}\begin{pmatrix} 1 & a \\ a & -1 \end{pmatrix} \quad [9]$$

where "a" is a real number.

Also, in the SC-FDMA symbol before a reference signal, the constellation of the first element of the first ACK/NACK signal vector, which overwrites stream 1, is relatively rotated by 90 degrees with respect to the second element.

Further, in the SC-FDMA symbol after the reference signal, the constellation of the second element of the second ACK/NACK signal vector, which overwrites stream 2, is relatively rotated by 90 degrees with respect to the first element.

By performing such processing, in the SC-FDMA symbol before the reference signal, an ACK/NACK signal is multiplied by coefficient 1 represented by equation 10.

(Equation 10)

$$\text{Coefficient 1} = \begin{pmatrix} e^{j\alpha} & (a+j) \\ e^{j\beta} & (-1+aj) \end{pmatrix} \quad [10]$$

On the other hand, in the SC-FDMA symbol immediately after the reference signal, an ACK/NACK signal is multiplied by coefficient 2 represented by equation 11.

(Equation 11)

$$\text{Coefficient 2} = \begin{pmatrix} e^{j\alpha} & (1+aj) \\ e^{j\beta} & (a-j) \end{pmatrix} \quad [11]$$

These coefficient 1 and coefficient 2 are orthogonal to each other. Therefore, by performing the above processing of an ACK/NACK signal, it is possible to give the diversity effect.

Also, in contrast, in the SC-FDMA symbol before the reference signal, the constellation of the second element of the first ACK/NACK signal vector, which overwrites stream 2, may be relatively rotated by 90 degrees with respect to the first element, and, in the SC-FDMA symbol after the reference signal, the constellation of the first element of the second ACK/NACK signal vector, which overwrites stream 1, may be relatively rotated by 90 degrees with respect to the second element.

Embodiment 4

[Terminal Configuration]

Figure 11:
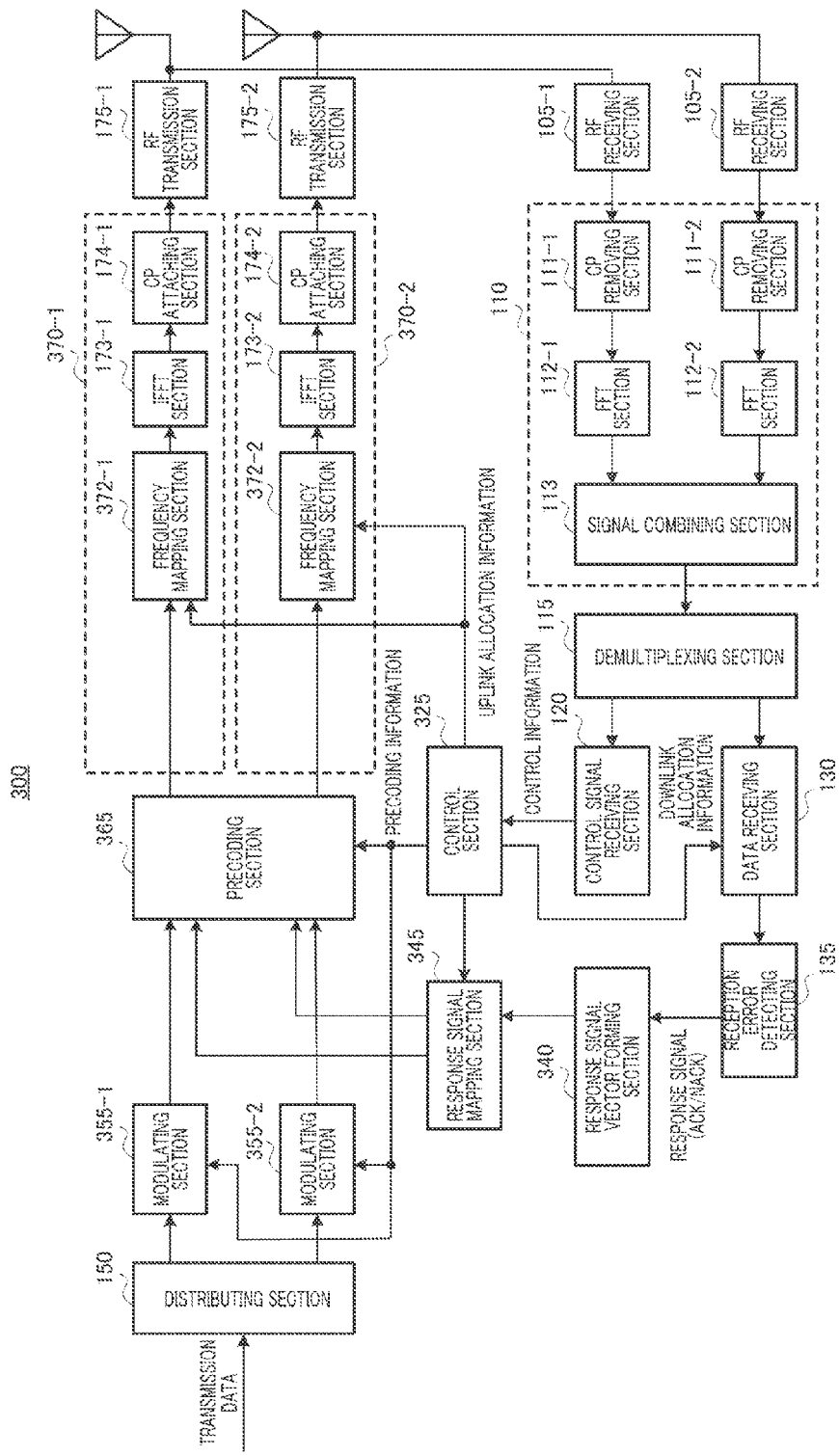
FIG. 11 is a block diagram showing a configuration of a terminal according to Embodiment 4 of the present invention.

FIG. 11 is a block diagram showing a configuration of terminal 300 according to Embodiment 4 of the present invention. In FIG. 11, blocks having the same functions as in FIG. 5 will be assigned the same reference numerals and their explanation will be omitted. Terminal 300 is provided with response signal vector forming section 340, response signal mapping section 345, modulating sections 355-1 and 355-2, precoding section 365 and OFDM signal forming sections 370-1 and 370-2. Also, in FIG. 11, similar to FIG. 5, terminal 300 that is a MIMO transmission apparatus has a plurality of antennas, and function blocks with a code branch number of "1" are associated with the first antenna and function blocks with a branch number of "2" are associated with a second antenna.

Control signal receiving section 120 receives a control signal from demultiplexing section 115. This control signal includes uplink allocation information and downlink allocation information. Control signal receiving section 120 extracts and outputs the uplink allocation information and the downlink allocation information to control section 325. Also, control signal receiving section 120 specifies the physical resource number at which a control signal for the subject terminal is included, and outputs the number to control section 325.

Control section 325 generates a data reception control signal based on the downlink allocation information received from control signal receiving section 120 and outputs the signal to data receiving section 130.

Also, control section 325 determines the MCS of a data signal based on the uplink allocation information. Further, control section 325 determines time/frequency resources and code resources for transmitting an ACK/NACK signal, from the physical resource numbers in which a control signal for the subject terminal is included. These items of information are outputted to a frequency mapping section.

Response signal vector forming section 340 forms ACK/NACK signal vectors based on ACK/NACK signals. Response signal vector forming section 340 forms the first ACK/NACK signal vector and a second ACK/NACK signal vector that are orthogonal to each other, and outputs these to response signal mapping section 345.

Response signal mapping section 345 maps the first and second elements of the first ACK/NACK signal vector (or second ACK/NACK signal vector), formed in response signal vector forming section 340, on the first stream and second stream, respectively. Response signal mapping section 345 maps the first ACK/NACK signal vector on the first slot and maps the second ACK/NACK signal vector on a second slot.

Modulating sections 355-1 and 355-2 modulate two data streams based on a directive from control section 325 and output the results to precoding section 365.

Precoding section 365 receives as input two data streams from modulating sections 355-1 and 355-2 and two streams on which the elements of ACK/NACK signal vectors are mapped, and applies precoding processing based on a directive of control section 325 to the first stream and the second stream. Precoding section 365 performs precoding processing using a matrix multiplying a 2×'2 unitary matrix by a constant number. The first stream and the second stream subjected to precoding processing are outputted to OFDM signal forming sections 370-1 and 370-2, respectively.

OFDM signal forming sections 370-1 and 370-2 receive as input the first stream and the second stream subjected to precoding processing, respectively, and form OFDM signals from the input streams. OFDM signal forming section 370-1 has frequency mapping section 372-1, IFFT section 173-1 and CP attaching section 174-1. OFDM signal forming section 370-2 has frequency mapping section 372-2, IFFT section 173-2 and CP attaching section 174-2.

Frequency mapping sections 372-1 and 372-2 map two streams including data signals and two streams including response signals, which are received as input from precoding section 365, on frequency according to a directive from control section 325. At this time, two streams including data and two streams including response signals are mapped on respective frequency positions. That is, OFDM signal forming sections 370-1 and 370-2 transmit the first stream and the second stream in which ACK/NACK signal vectors are subjected to precoding processing, by different subcarriers. That is, in this case, frequency division multiplexing is applied to the first stream and the second stream in which ACK/NACK signal vectors are subjected to precoding processing.

[Base Station Configuration]

Figure 12:
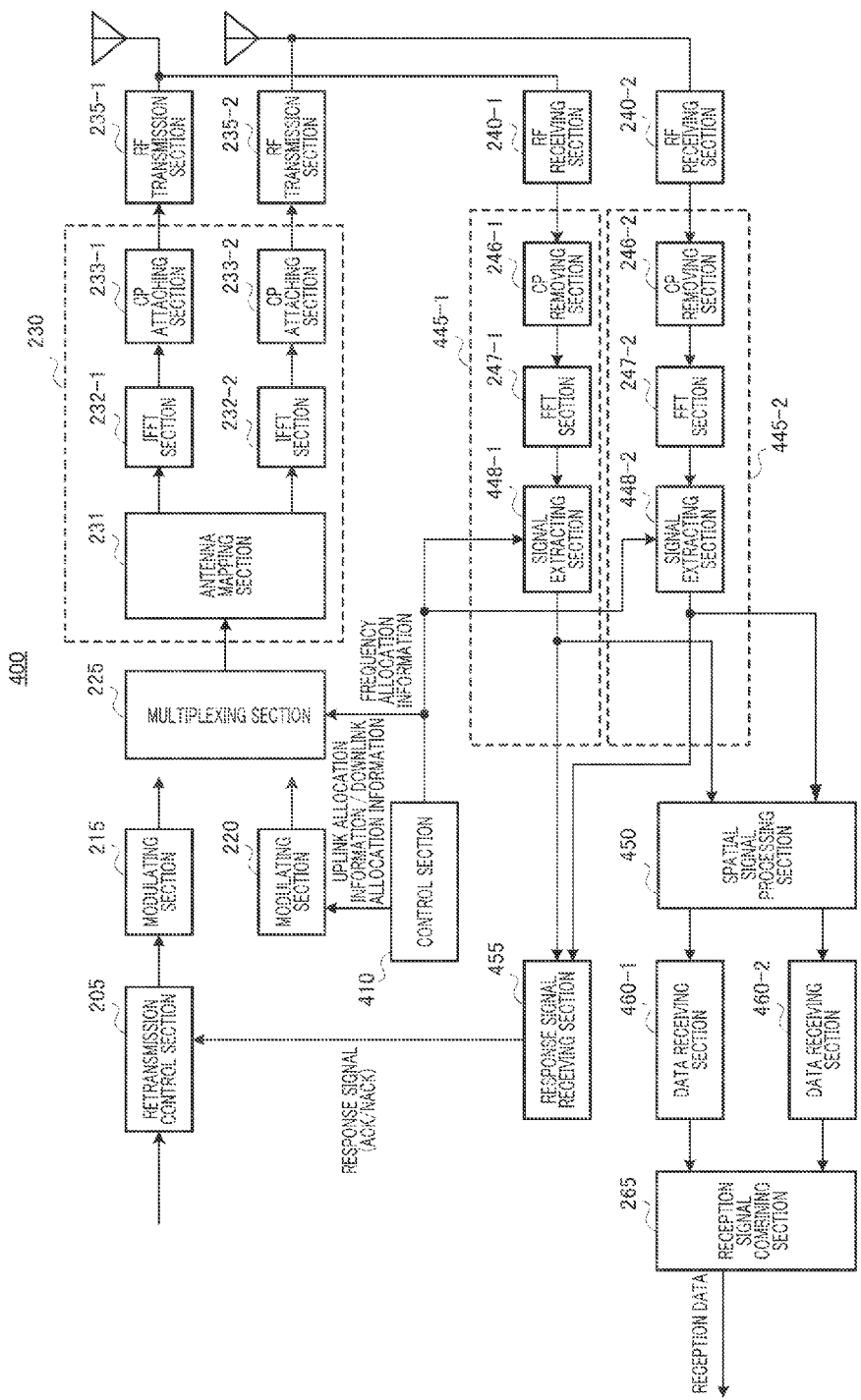
FIG. 12 is a block diagram showing a configuration of a base station according to Embodiment 4 of the present invention.

FIG. 12 is a block diagram showing a configuration of base station 400 according to Embodiment 4 of the present invention. In FIG. 12, base station 400 is provided with control section 410, OFDM signal demodulating sections 445-1 and 445-2, spatial signal processing section 450, response signal receiving section 455 and data receiving sections 460-1 and 460-2. Also, in FIG. 12, base station 400 that is a MIMO receiving apparatus has a plurality of antennas, and function blocks with a code branch number of "1" are associated with the first antenna, and function blocks with a branch number of "2" are associated with a second antenna.

Control section 410 generates allocation information (including uplink allocation information and downlink allocation information) transmitted via a PDCCH (Physical Downlink Control CHannel) and outputs this allocation information to modulating section 220. Also, control section 410 outputs frequency allocation information (including uplink data frequency allocation information, frequency allocation information of uplink response signals and downlink frequency allocation information) of frequencies allocated to terminal 300, which is the transmission destination of allocation information, to multiplexing section 225 and OFDM signal demodulating section 445.

RF receiving sections 240-1 and 240-2 receive uplink radio signals transmitted from terminal 300, via different antennas. RF receiving sections 240-1 and 240-2 perform radio reception processing of the radio reception signals and output the resulting baseband signals to OFDM signal demodulating sections 445-1 and 445-2. Here, in uplink, as described above, OFDM signals are transmitted.

OFDM signal demodulating sections 445-1 and 445-2 demodulate the reception OFDM signals received from RF receiving sections 240-1 and 240-2. Signal extracting sections 448-1 and 448-2 extract frequency components corresponding to the frequency allocation information of uplink data received from control section 410, from frequency domain signals, and output the components to spatial signal processing section 450. Also, signal extracting sections 448-1 and 448-2 extract frequency components corresponding to the frequency allocation information of uplink response signals received from control section 410, from frequency domain signals, and output the components to response signal receiving section 455.

Spatial signal processing section 450 applies equalization processing by an algorithm such as MMSE, to the frequency domain signals of uplink data extracted every terminal 300. By this means, information of two streams from which inter-stream interference is removed, are outputted to data receiving sections 460-1 and 460-2.

Response signal receiving section 455 combines ACK/NACK signals repeated two times over two slots, by maximum ratio combining, for example. Then, response signal receiving section 455 decides whether an ACK/NACK signal indicates an ACK or the ACK/NACK signal indicates a NACK, based on the combined signal, and, according to the decision result, outputs an ACK signal or a NACK signal to retransmission control section 205.

Data receiving sections 460-1 and 460-2 demodulate and decode each of two uplink data streams demultiplexed in spatial signal processing section 450.

[Operations of Terminal 100]

In a case where terminal 300 receives a directive from a base station so as to transmit uplink data in RANK 2 at the timing when a response signal for downlink data should be transmitted (i.e., in a case of receiving a control signal associated with uplink allocation), terminal 300 maps the frequency domain components of uplink data and the frequency components of uplink signals on the frequency axis according to frequency allocation information of data signals and frequency allocation information of response signals. Also, time/frequency resources and code resources to transmit a response signal are determined in association with resources occupied by a downlink control signal.

First, in terminal 300, control section 325 determines the MCS (Modulation and Coding Scheme) of a data signal based on uplink allocation information. Also, control section 325 determines physical resources to transmit an uplink response signal, according to the physical resource numbers occupied by a control signal that designates allocation of downlink data corresponding to a downlink response signal. Here, an ACK/NACK signal is duplicated and placed over two slots.

Also, response signal .vector forming section 340 forms the first ACK/NACK signal vector and a second ACK/NACK signal vector that are orthogonal to each other, based on ACK/NACK signals.

Then, response signal mapping section 345 maps the first ACK/NACK signal vector in the first slot and maps the second ACK/NACK signal vector in a second slot. Also, as described above, the first and second elements of the first ACK/NACK signal vector (or second ACK/NACK signal vector) are mapped on the first stream and the second stream, respectively.

Then, precoding section 365 multiplies the input first stream and second stream by a precoding matrix. As this precoding matrix, a matrix multiplying a 2×2 unitary matrix by a constant number is used. Also, a precoding matrix used for data signals and a precoding matrix used for ACK/NACK signals are the same.

Then, OFDM signal forming sections 370-1 and 370-2 form OFDM signals from the first stream and second stream subjected to precoding, respectively.

Figure 13:
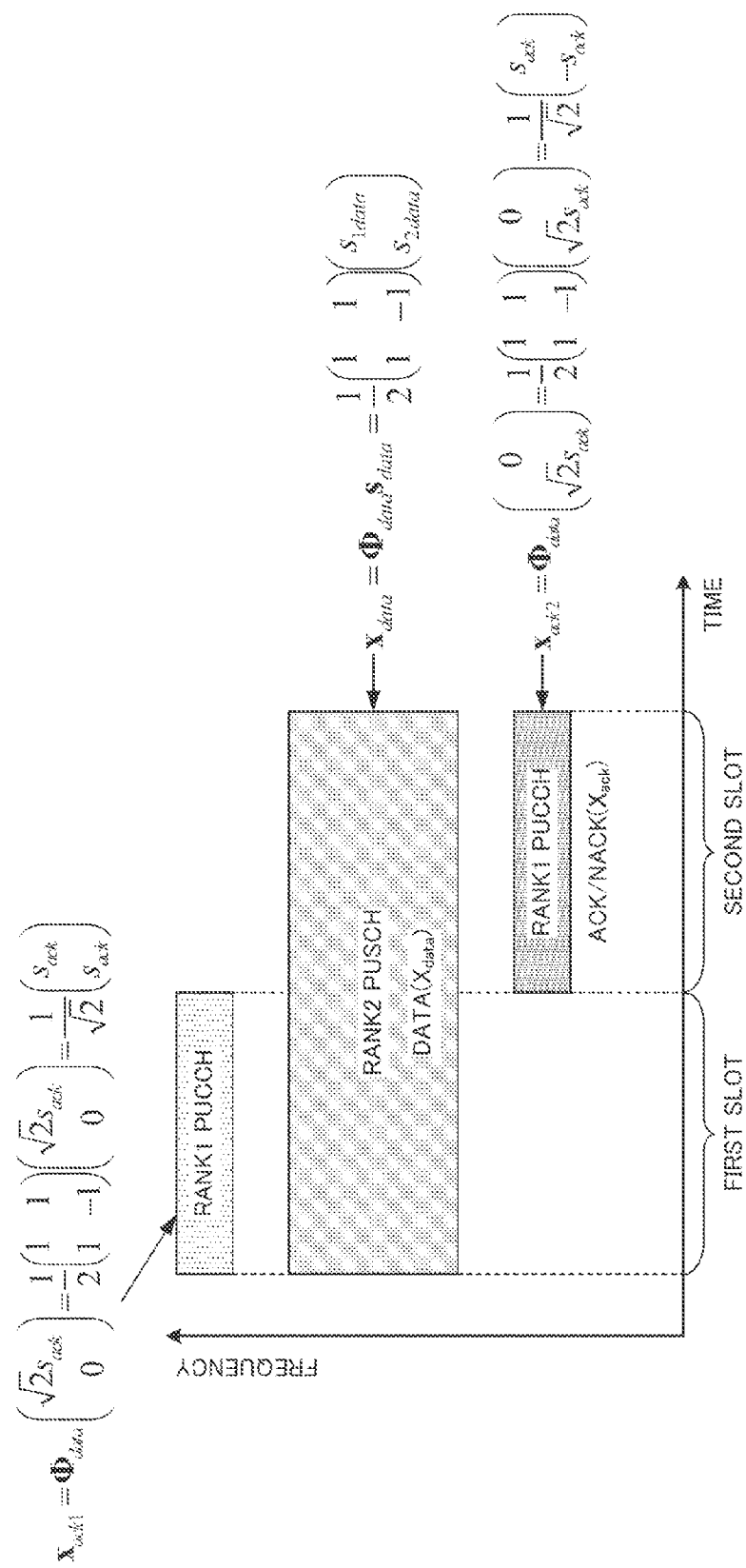
FIG. 13 shows an OFDM signal over two slots in a case where uplink data and a response signal are placed in the same subframe, in Embodiment 4.

FIG. 13 shows an OFDM signal over two slots in a case where uplink data and a response signal are placed in the same subframe, in Embodiment 4.

Here, as shown in FIG. 13, in Embodiment 4, the first ACK/NACK signal vector is represented by $(aS_{ack}, 0)$, and the second ACK/NACK signal vector is represented by $(0, aS_{ack})$. Further, "a" is not 1 but $\sqrt{2}$.

That is, the first element of the first ACK/NACK signal vector outputted from response signal mapping section 345 to precoding section 365 is $aS_{ack}$, and the first element of the second ACK/NACK signal vector is 0. Also, the second element of the first ACK/NACK signal vector outputted from response signal mapping section 345 to precoding section 365 is 0, and the second element of the second ACK/NACK signal vector is $aS_{ack}$.

Further, response signal vector forming section 340 forms ACK/NACK signal vectors having, as elements, ACK/NACK signals whose amplitude value is multiplied by $\sqrt{2}$.

Also, a precoding matrix used in Embodiment 4 is $\Phi_{data} = \frac{1}{2} \times (1,1;1,-1)$ that is a matrix multiplying a unitary matrix by a constant number.

Under the above conditions, precoded first ACK/NACK signal vector $X_{ack1}$ included in the first slot is calculated as in Embodiment 1 and represented by following equation 12.

(Equation 12)

$$x_{ack1} = \Phi_{data} \begin{pmatrix} \sqrt{2} s_{ack} \\ 0 \end{pmatrix} = \frac{1}{2} \begin{pmatrix} 1 & 1 \\ 1 & -1 \end{pmatrix} \begin{pmatrix} \sqrt{2} s_{ack} \\ 0 \end{pmatrix} = \frac{1}{\sqrt{2}} \begin{pmatrix} s_{ack} \\ s_{ack} \end{pmatrix} \quad [12]$$

Also, precoded second ACK/NACK signal vector $X_{ack2}$ included in the second slot is calculated as in Embodiment 1 and represented by following equation 13.

(Equation 13)

$$x_{ack2} = \Phi_{data} \begin{pmatrix} 0 \\ \sqrt{2} s_{ack} \end{pmatrix} = \frac{1}{2} \begin{pmatrix} 1 & 1 \\ 1 & -1 \end{pmatrix} \begin{pmatrix} 0 \\ \sqrt{2} s_{ack} \end{pmatrix} = \frac{1}{\sqrt{2}} \begin{pmatrix} s_{ack} \\ -s_{ack} \end{pmatrix} \quad [13]$$

As seen from equations 12 and 13, similar to Embodiment 1, precoded first ACK/NACK signal vector $X_{ack1}$ and precoded second ACK/NACK signal vector $X_{ack2}$ are orthogonal to each other, so that it is possible to obtain the spatial diversity effect. That is, $X_{ack1}$ and $X_{ack2}$ have the beam-forming effect by orthogonal beams, so that the base station side can receive one of the ACK/NACK signal vectors with high quality. Therefore, it is possible to prevent degradation in reception quality due to the beam-forming effect.

Also, by multiplying an ACK/NACK signal having the same power as that of the data signal mapped in each stream by $\sqrt{2}$, if one element of the ACK/NACK signal is made "0," it is possible to make the transmission power of the ACK/NACK signal vector equal to the transmission power of the data signal.

As described above, according to the present embodiment, terminal 300 that is a MIMO transmission apparatus maps the first and second elements of ACK/NACK signal vectors formed based on ACK/NACK signals on the first and second streams, respectively, and repeatedly transmits the results over two slots. In that terminal 300, response signal vector forming section 340, which forms ACK/NACK signal vectors based on ACK/NACK signals, forms $(a \cdot S_{ack}, 0)$ as an ACK/NACK signal vector in the first SC-FDMA symbol and forms $(0, a \cdot S_{ack})$ as an ACK/NACK signal vector in the second SC-FDMA symbol, and precoding section 365 performs precoding of the ACK/NACK signal vectors formed in response signal vector forming section 340 by a matrix multiplying a unitary matrix by a constant number.

By this means, it is possible to prevent degradation in reception quality due to the beam-forming effect and ideally obtain the spatial diversity effect. Also, in contrast, if $(0, a \cdot S_{ack})$ is used as an ACK/NACK signal vector in the first SC-FDMA symbol and $(a \cdot S_{ack}, 0)$ is used as an ACK/NACK signal vector in the second SC-FDMA symbol, it is possible to provide the same effect.

Here, these effects are obtained by the fact that a matrix multiplying a unitary matrix by a constant number, in which component row vectors are orthogonal, is used as a precoding matrix, and that the ACK/NACK signal vector in the first slot and the second ACK/NACK signal vector in the second slot are orthogonal.

That is, to provide these effects, an essential requirement is to make the ACK/NACK signal vector in the first slot and the ACK/NACK signal vector in the second slot orthogonal and perform precoding of the formed ACK/NACK signal vectors by a matrix multiplying a unitary matrix by a constant number.

Also, in terminal 300, response signal vector forming section 340 multiplies an ACK/NACK signal by $\sqrt{2}$.

By this means, even if one element of an ACK/NACK signal vector is made "0," it is possible to make the transmission power of a data signal vector equal to the transmission power of the ACK/NACK signal vector.

Also, in terminal 300, OFDM signal forming sections 370-1 and 370-2 transmit ACK/NACK signal vectors subjected to precoding processing in precoding section 365 and data streams subjected to precoding processing, by different subcarriers. That is, ACK/NACK signal vectors and data streams are transmitted by frequency division multiplexing.

Further, OFDM signal forming sections 370-1 and 370-2 may make subcarriers in which ACK/NACK signal vectors subjected to precoding processing in precoding section 365 are placed, vary between the first slot and the second slot.

Embodiment 5

Similar to terminal 300 according to Embodiment 4, a terminal according to Embodiment 5 makes the ACK/NACK signal vector in the first slot and the ACK/NACK signal vector in the second slot orthogonal and performs precoding of the formed ACK/NACK signal vectors by a matrix multiplying a unitary matrix by a constant number. Here, the terminal according to Embodiment 5 differs from terminal 300 according to Embodiment 4 in formed ACK/NACK signal vectors. Also, a basic configuration of the terminal according to the present embodiment is the same as the configuration of the terminal explained in Embodiment 4. Therefore, the terminal according to the present embodiment will be explained using FIG. 11.

in terminal 300 according to Embodiment 5, response signal vector forming section 340 forms ACK/NACK signal vectors based on ACK/NACK signals. Response signal vector forming section 340 forms the first ACK/NACK signal vector and a second ACK/NACK signal vector that are orthogonal to each other.

Figure 14:
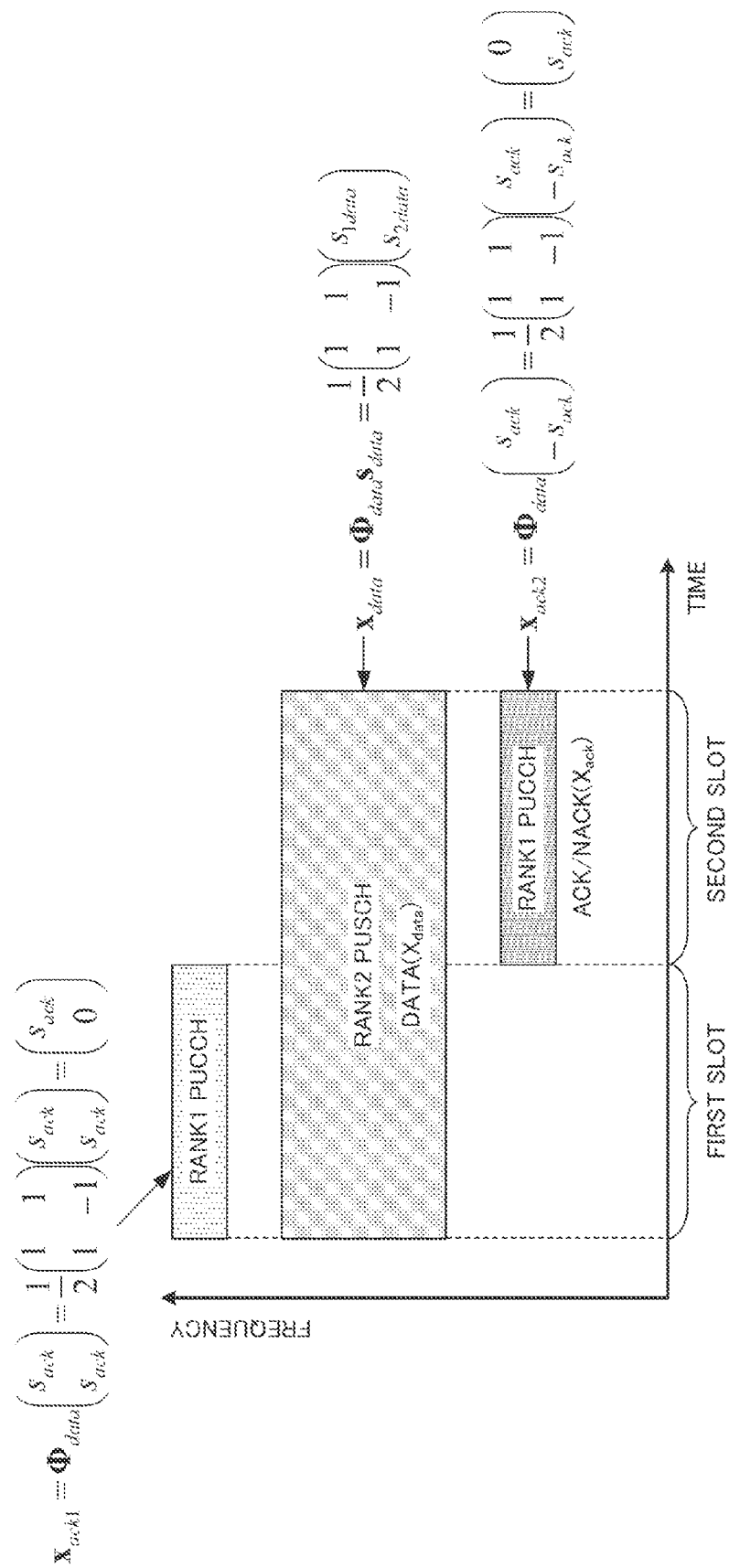
FIG. 14 shows an OFDM signal over two slots in a case where uplink data and a response signal are placed in the same subframe, in Embodiment 5.

FIG. 14 shows an OFDM signal over two slots in a case where uplink data and a response signal are placed in the same subframe, in Embodiment 5.

As shown in FIG. 14, in Embodiment 2, the first ACK/NACK signal vector is represented by $(S_{ack}, S_{ack})$ and a second ACK/NACK signal vector is represented by $(S_{ack}, -S_{ack})$. That is, in terminal 300 according to Embodiment 5, response signal vector forming section 340 forms the second ACK/NACK signal vector by rotating the constellation of the second element of the first ACK/NACK signal vector by 180 degrees.

That is, precoded first ACK/NACK signal vector $X_{ack1}$ included in the first slot is calculated as in Embodiment 2 and represented by following equation 14.

(Equation 14)

$$x_{ack1} = \Phi_{data}\begin{pmatrix} s_{ack} \\ s_{ack} \end{pmatrix} = \frac{1}{2}\begin{pmatrix} 1 & 1 \\ 1 & -1 \end{pmatrix}\begin{pmatrix} s_{ack} \\ s_{ack} \end{pmatrix} = \begin{pmatrix} s_{ack} \\ 0 \end{pmatrix} \quad [14]$$

Also, precoded second ACK/NACK signal vector $X_{ack2}$ included in the second slot is calculated as in Embodiment 2 and represented by following equation 15.

(Equation 15)

$$x_{ack2} = \Phi_{data}\begin{pmatrix} s_{ack} \\ -s_{ack} \end{pmatrix} = \frac{1}{2}\begin{pmatrix} 1 & 1 \\ 1 & -1 \end{pmatrix}\begin{pmatrix} s_{ack} \\ -s_{ack} \end{pmatrix} = \begin{pmatrix} 0 \\ s_{ack} \end{pmatrix} \quad [15]$$

As seen from equation 14 and equation 15, as in Embodiment 2, precoded first ACK/NACK signal vector $X_{ack1}$ and precoded second ACK/NACK signal vector $X_{ack2}$ are orthogonal, so that it is possible to provide the spatial diversity effect.

Also, in contrast, if $(S_{ack}, -S_{ack})$ is used as an ACK/NACK signal vector in the first slot and $(S_{ack}, S_{ack})$ is used as an ACK/NACK signal vector in the second slot, it is possible to provide the same effect.

Embodiment 6

Similar to terminal 300 according to Embodiment 4, a terminal according to Embodiment 6 makes the ACK/NACK signal vector in the first slot and the ACK/NACK signal vector in the second slot orthogonal and performs precoding of the formed ACK/NACK signal vectors by a matrix multiplying a unitary matrix by a constant number. Here, the terminal according to Embodiment 6 differs from terminal 300 according to Embodiment 4 in formed ACK/NACK signal vectors. Also, a basic configuration of the terminal according to the present embodiment is the same as the configuration of the terminal explained in Embodiment 4. Therefore, the terminal according to the present embodiment will be explained using FIG. 11.

In terminal 300 according to Embodiment 6, response signal vector forming section 340 forms ACK/NACK signal vectors based on ACK/NACK signals. Response signal vector forming section 340 forms the first ACK/NACK signal vector and a second ACK/NACK signal vector that are orthogonal to each other.

Figure 15:
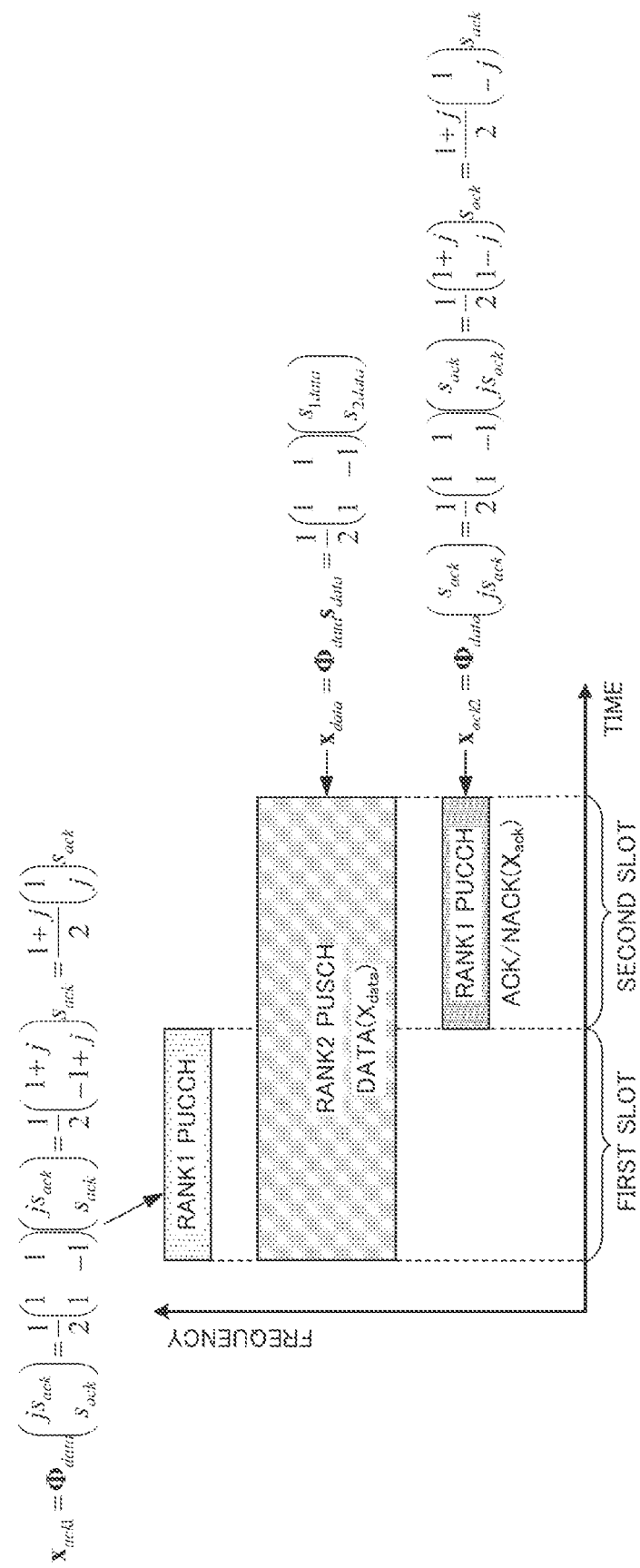
FIG. 15 shows an OFDM signal over two slots in a case where uplink data and a response signal are placed in the same subframe, in Embodiment 6.

FIG. 15 shows an OFDM signal over two slots in a case where uplink data and a response signal are placed in the same subframe, in Embodiment 6.

As shown in FIG. 15, in Embodiment 6, the first ACK/NACK signal vector is represented by $(j \cdot S_{ack}, S_{ack})$ and a second ACK/NACK signal vector is $(S_{ack}, j \cdot S_{ack})$. That is, in terminal 300 according to Embodiment 6, response signal vector forming section 340 forms the first ACK/NACK signal vector by rotating the constellation of the first element of ACK/NACK signal vector $(S_{ack}, S_{ack})$ by 90 degrees. Also, response signal vector forming section 340 forms the second ACK/NACK signal vector by rotating the constellation of the second element of ACK/NACK signal vector $(S_{ack}, S_{ack})$ by 90 degrees. Here, symbols forming the ACK/NACK signal are modulated by BPSK or QPSK. Therefore, processing of rotating a constellation by 90 degrees can be realized only by switching between the I component and the Q component and switching between positivity and negativity. This processing does not require a multiplier, and therefore has a smaller amount of processing.

That is, precoded first ACK/NACK signal vector $X_{ack1}$ included in the slot is calculated as in Embodiment 3 and represented by following equation 16.

(Equation 16)

$$x_{ack1} = \Phi_{data}\begin{pmatrix} js_{ack} \\ s_{ack} \end{pmatrix} = \frac{1}{2}\begin{pmatrix} 1 & 1 \\ 1 & -1 \end{pmatrix}\begin{pmatrix} js_{ack} \\ s_{ack} \end{pmatrix} = \frac{1}{2}\begin{pmatrix} 1+j \\ -1+j \end{pmatrix}s_{ack} = \frac{1+j}{2}\begin{pmatrix} 1 \\ j \end{pmatrix}s_{ack} \quad [16]$$

Also, precoded second ACK/NACK signal vector $X_{ack2}$ included in the second SC-FDMA symbol is calculated as in Embodiment 3 and represented by following equation 17.

(Equation 17)

$$x_{ack2} = \Phi_{data}\begin{pmatrix} s_{ack} \\ js_{ack} \end{pmatrix} = \frac{1}{2}\begin{pmatrix} 1 & 1 \\ 1 & -1 \end{pmatrix}\begin{pmatrix} s_{ack} \\ js_{ack} \end{pmatrix} = \frac{1}{2}\begin{pmatrix} 1+j \\ 1-j \end{pmatrix}s_{ack} = \frac{1+j}{2}\begin{pmatrix} 1 \\ -j \end{pmatrix}s_{ack} \quad [17]$$

As seen from equation 16 and equation 17, similar to Embodiment 3, precoded first ACK/NACK signal vector $X_{ack1}$ and precoded second ACK/NACK signal vector $X_{ack2}$ are orthogonal, so that it is possible to provide the spatial diversity effect. Therefore, it is possible to prevent degradation in reception quality due to the beam-forming effect.

Here, comparison with the case of Embodiment 4 will be shown. In the case of Embodiment 4, precoding corresponding to a data part is also multiplied by a response signal, and, consequently, although the same beam-forming gain as that of the first data stream is provided in the first slot and the same beam-forming gain as that of a second data stream is provided in a second data stream, these beam forming gains are generally controlled to differ from each other. For example, with beam-forming control in known eigenmode transmission, beam-forming gain corresponding to the first eigenvalue of a transmission path matrix is given to the first stream, and beam-forming gain corresponding to the second eigenvalue of the transmission path matrix is given to the second stream. That is, there is a possibility that the reception power of a response signal on the base station side in the first slot significantly differs from the reception power of a response signal on the base station side in the second slot. By contrast with this, in Embodiment 6, it is possible to reduce the power difference between a response signal in the first slot and a response signal in a second slot, and provide the same diversity effect as in Embodiment 1. A plurality of response signals from terminal 300 are code-multiplexed using the same time/frequency resources and transmitted, so that, when the power difference between slots is small, transmission power control in code multiplexing is less likely to be adversely affected, and it is possible to simplify transmission power control in a base station.

Also, compared to the case of Embodiment 5, regarding the reception power of a response signal in the first slot and the reception power of a response signal in a second slot, these reception powers are influenced by transmission antenna gain itself and the difference between transmission paths from terminal antennas to a base station in Embodiment 5, and the reception power difference tends to be large, but it is possible to reduce the power difference between slots in Embodiment 6.

Also, it is equally possible to generalize the precoding matrix of Embodiment 6 in the same way as in Embodiment 3.

That is, first, precoding matrix $\Phi_{unitary}$ is represented by equation 18.

(Equation 18)

$$\Phi_{unitary} = \begin{pmatrix} e^{j\alpha} & 0 \\ 0 & e^{j\beta} \end{pmatrix}\begin{pmatrix} 1 & a \\ a & -1 \end{pmatrix} \quad [18]$$

where "a" is a real number.

Also, the constellation of the first element of the first ACK/NACK signal vector, which overwrites stream 1 in the first slot, is relatively rotated by 90 degrees with respect to the second element.

Further, the constellation of the second element of the second ACK/NACK signal vector, which overwrites stream 2 in the second slot, is relatively rotated by 90 degrees with respect to the first element.

By performing such processing, in the first slot, an ACK/NACK signal is multiplied by coefficient 1 represented by equation 19.

(Equation 19)

$$\text{Coefficient 1} = \begin{pmatrix} e^{j\alpha} & (a+j) \\ e^{j\beta} & (-1+aj) \end{pmatrix} \quad [19]$$

On the other hand, in the second slot, an ACK/NACK signal is multiplied by coefficient 2 represented by equation 20.

(Equation 20)

$$\text{Coefficient 2} = \begin{pmatrix} e^{j\alpha} & (1+aj) \\ e^{j\beta} & (a-j) \end{pmatrix} \quad [20]$$

These coefficient 1 and coefficient 2 are orthogonal to each other. Therefore, by performing the above processing of an ACK/NACK signal, it is possible to give the diversity effect.

Also, in contrast, the constellation of the second element of the first ACK/NACK signal vector, which overwrites stream 2 in the first slot, may be relatively rotated by 90 degrees with respect to the first element, and the constellation of the first element of the second ACK/NACK signal vector, which overwrites stream 1 in the second slot, may be relatively rotated by 90 degrees with respect to the second element.

Other Embodiment (1) Cases have been described above with Embodiments 1 to 3 where RANK 2 transmission is applied to an uplink data signal. However an embodiment is possible where RANK 1 transmission is applied to uplink data, that is, where uplink spatial multiplexing transmission is not performed. In this embodiment, the data signal part in RANK 1 transmission needs to be overwritten by an ACK/NACK signal itself. In this case, it is possible to give the same beam-forming effect as that of the data signal part to the ACK/NACK signal. In the case of RANK 1 transmission, beam-forming suitable to data transmission is applied to the data part, so that, by giving the same beam-forming effect to an ACK/NACK signal, it is possible to stabilize the ACK/NACK performance.

Figure 16:
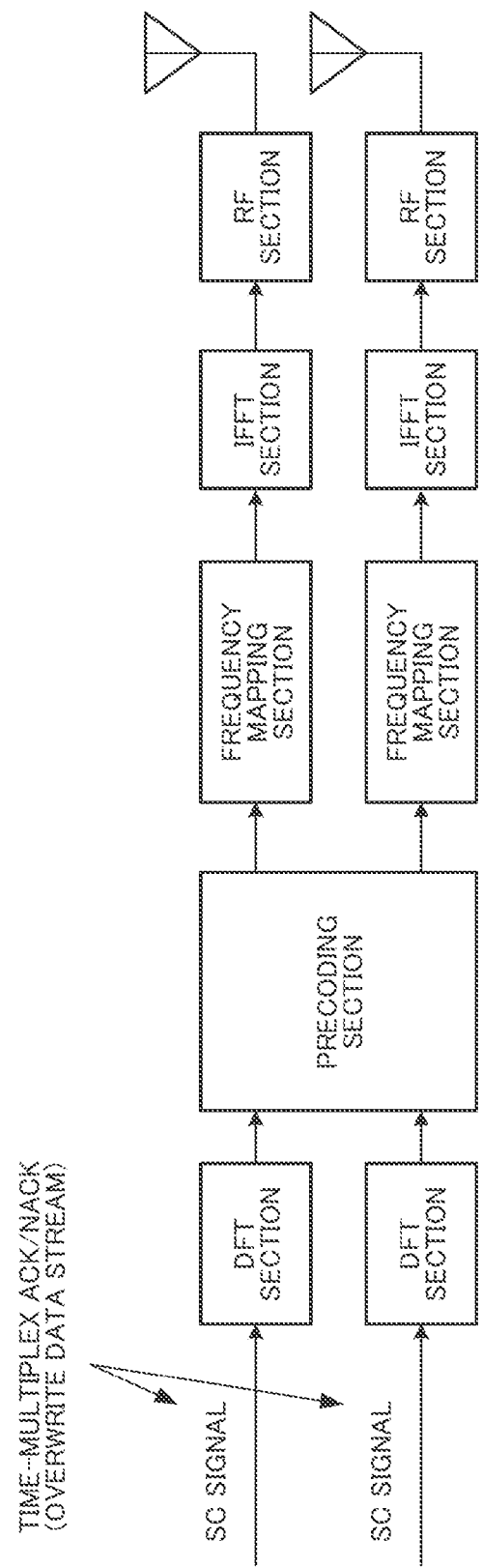
FIG. 16 illustrates a configuration variation of the terminal shown in FIG. 5.
Figure 17:
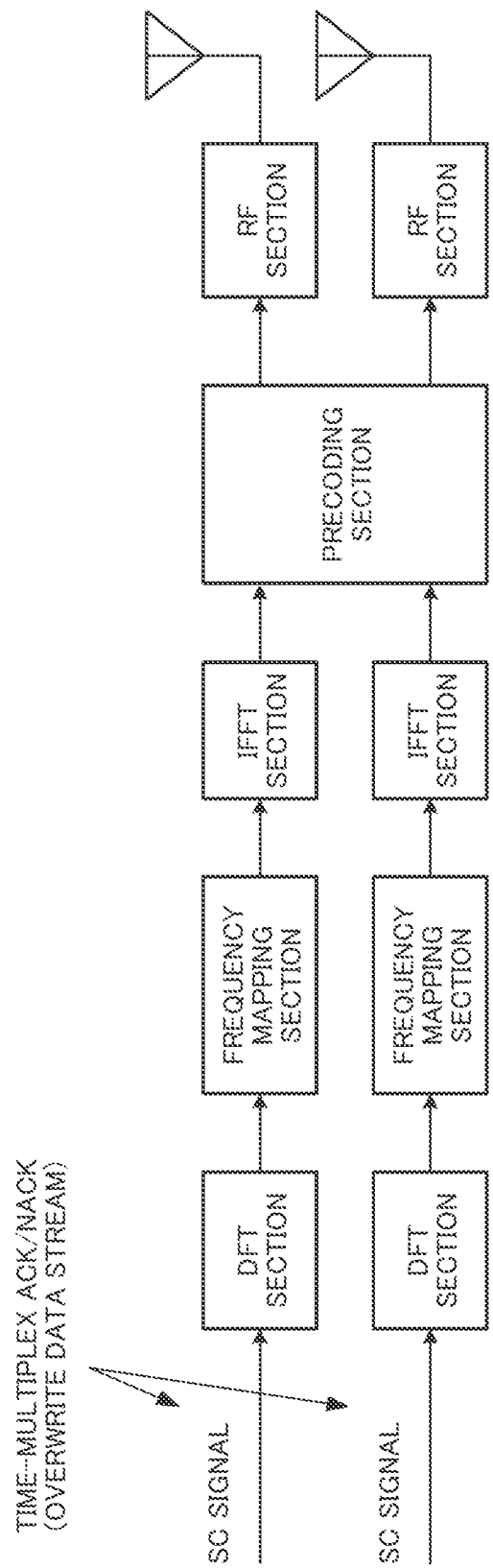
FIG. 17 illustrates a configuration variation of the terminal shown in FIG. 5.

(2) Also, cases have been described above with Embodiments 1 to 3 where precoding section 165 is provided before DFT section 171. However, the present invention is not limited to this, and, in the case of a configuration in which a precoding section is provided between a DFT section and an IFFT section as shown in FIG. 16, or in the case of a configuration in which a precoding section is provided after an IFFT section as shown in FIG. 17, the same effect is expected.

(3) Also, although the same response signal vector subjected to precoding processing is repeatedly placed in a plurality of time continuous signals included in one SC-FDMA symbol in Embodiments 1 to 3, upon placing a response signal in a plurality of time continuous signals in one SC-FDMA symbol, the response signal may be scrambled before being received as input in a precoding section. In this case, the response signal is scrambled and then received as input in the precoding section, and, consequently, the direction of the beam formed in each SC-FDMA symbol does not change, so that the same effect as in Embodiments 1 to 3 is expected.

(4) Also, cases have been described above with Embodiments 4 to 6 where RANK 2 transmission is applied to an uplink data signal. However, an embodiment is possible where RANK 1 transmission is applied to uplink data, that is, where uplink spatial multiplexing transmission is not performed. In this embodiment, the data signal part in RANK 1 transmission needs to be overwritten by an ACK/NACK signal itself. In this case, it is possible to give the same beam-forming effect as that of the data signal part to the ACK/NACK signal. In the case of RANK 1 transmission, beam-forming suitable to data transmission is applied to the data part, so that, by giving the same beam-forming effect to an ACK/NACK signal, it is possible to stabilize the ACK/NACK performance.

(5) Also, although cases have been described above with Embodiments 4 to 6 where OFDM is applied to uplink data, the present invention is not limited to this. For example, even if uplink data is, for example, an SC-FDMA signal, the present invention is applicable in a case where an uplink data signal and an uplink response signal are multiplexed in the frequency domain and transmitted in the same subframe. That is, the present invention does not depend on a transmission scheme or multiplexing scheme of data part, and is generally applicable in a case where uplink data and an uplink response signal are frequency-multiplexed.

(6) Also, in Embodiments 4 to 6, if there are a plurality of subcarriers on which a response signal has to be mapped, it is equally possible to repeat mapping a response signal vector itself subjected to precoding processing, or perform precoding processing of the result of multiplying a response signal by a scramble code that varies between subcarriers, and map the result on subcarriers. In both cases, the same effect as in Embodiments 4 to 6 is expected.

(7) An example of a response signal has been explained using an ACK/NACK signal in Embodiments 1 to 6. However, the present invention is not limited to this, and is applicable to other response signals than ACK/NACK signals.

Further, the present invention is even applicable to a case where control signals other than response signals are fed back. Control signals other than response signals include a rank indicator ("RI") for transmitting an optimal RANK number in downlink communication, a channel quality indicator ("CQI") to indicate the quality of the downlink transmission path, and so on.

(8) Also, although the present invention has been described above with Embodiments 1 to 6 using antennas, the present invention is equally applicable to antenna ports. An antenna port refers to a theoretical antenna comprised of one or a plurality of physical antennas. That is, an antenna port does not necessarily represent one physical antenna, and may represent an antenna array comprised of a plurality of antennas. For example, 3GPP LTE does not define how many physical antennas an antenna port is formed with, but defines that an antenna port is the minimum unit for transmitting different reference signals in a base station. Also, an antenna port may be defined as the minimum unit for multiplication of precoding vector weighting.

(9) Although example cases have been described above with embodiments and their variation example where the present invention is implemented with hardware, the present invention can be implemented with software.

Furthermore, each function block employed in the description of each of the aforementioned embodiments may typically be implemented as an LSI constituted by an integrated circuit. These may be individual chips or partially or totally contained on a single chip. "LSI" is adopted here but this may also be referred to as "IC," "system LSI," "super LSI," or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells in an LSI can be regenerated is also possible.

Further, if integrated circuit technology comes out to replace LSI's as a result of the advancement of semiconductor technology or a derivative other technology, it is naturally also possible to carry out function block integration using this technology. Application of biotechnology is also possible.

The disclosures of Japanese Patent Application No. 2008-195361, filed on Jul. 29, 2008, and Japanese Patent Application No. 2009-006967, filed on Jan. 15, 2009, including the specifications, drawings and abstracts, are incorporated herein by reference in their entireties.

INDUSTRIAL APPLICABILITY

The MIMO transmission apparatus and MIMO transmission method of the present invention are useful to improve the reception quality of response signals.

The invention claimed is:

1. A reception apparatus comprising:
a receiver configured to receive a first stream and a second stream that are transmitted from a transmission apparatus and that are spatial-multiplexed, wherein, the first stream is generated using a first sequence, a first ACK/NACK signal vector and a second ACK/NACK signal vector different from the first ACK/NACK signal vector, and the second stream is generated using a second sequence different from the first sequence, the first ACK/NACK signal vector and the second ACK/NACK signal vector, each of the first ACK/NACK signal vector and the second ACK/NACK signal vector being formed based on a signal indicative of ACK/NACK; and
a detector configured to detect said signal indicative of ACK/NACK based on the first ACK/NACK signal vector and the second ACK/NACK signal vector.

2. The reception apparatus according to claim 1, wherein a combination of elements included in the first ACK/NACK signal vector is different from a combination of elements included in the second ACK/NACK signal vector.

3. The reception apparatus according to claim 1, wherein a phase of the first ACK/NACK signal vector is different from a phase of the second ACK/NACK signal vector.

4. The reception apparatus according to claim 1, wherein each of the first ACK/NACK signal vector and the second ACK/NACK signal vector includes an element which is the same as said signal indicative of ACK/NACK and another element which is different from said signal indicative of ACK/NACK.

5. The reception apparatus according to claim 4, wherein the other element is generated from said signal indicative of ACK/NACK.

6. The reception apparatus according to claim 1, wherein:
the first ACK/NACK signal vector includes a first element and a second element, which are both the same as said signal indicative of ACK/NACK; and
the second ACK/NACK signal vector includes a first element which is the same as said signal indicative of ACK/NACK and a second element which is generated from said signal indicative of ACK/NACK.

7. The reception apparatus according to claim 1, wherein each of the first ACK/NACK signal vector and the second ACK/NACK signal vector includes a first element which is generated from said signal indicative of ACK/NACK and a second element which is not generated from said signal indicative of ACK/NACK.

8. The reception apparatus according to claim 1, wherein the first ACK/NACK signal vector is mapped on a first symbol and the second ACK/NACK signal vector is mapped on a second symbol, the first and second symbols being included in one subframe.

9. The reception apparatus according to claim 8, wherein, in said one subframe, the first symbol is a symbol immediately before a reference signal, and the second symbol is a symbol immediately after the reference signal.

10. The reception apparatus according to claim 1, wherein the first ACK/NACK signal vector and the second ACK/NACK signal vector are respectively mapped on corresponding symbols in one subframe repeatedly.

11. The reception apparatus according to claim 1, wherein the first ACK/NACK signal vector and the second ACK/NACK signal vector are respectively replicated, and the replicated ACK/NACK signal vectors are transmitted on the first stream and the second stream by being spatial-multiplexed.

12. The reception apparatus according to claim 1, wherein the first stream and the second stream do not include an element that is zero.

13. The reception apparatus according to claim 1, wherein the first ACK/NACK signal vector is orthogonal to the second ACK/NACK signal vector.

14. The reception apparatus according to claim 1, wherein the first ACK/NACK signal vector and the second ACK/NACK signal vector are mapped around a reference signal on each slot in one subframe.

15. The reception apparatus according to claim 1, wherein the first ACK/NACK signal vector and the second ACK/NACK signal vector are mapped by overwriting data.

16. A reception method comprising:
receiving a first stream and a second stream that are transmitted from a transmission apparatus and that are spatial-multiplexed, wherein, the first stream is generated using a first sequence, a first ACK/NACK signal vector and a second ACK/NACK signal vector different from the first ACK/NACK signal vector, and the second stream is generated using a second sequence different from the first sequence, the first ACK/NACK signal vector and the second ACK/NACK signal vector, each of the first ACK/NACK signal vector and the second ACK/NACK signal vector being formed based on a signal indicative of ACK/NACK; and
detecting said signal indicative of ACK/NACK based on the first ACK/NACK signal vector and the second ACK/NACK signal vector.

* * * * *